US012699819B2

(12) United States Patent
Blom-Schieber et al.

(10) Patent No.: US 12,699,819 B2
(45) Date of Patent: Aug. 4, 2026

(54) METHODS AND SYSTEM FOR DETERMINING FIBER PLACEMENT START LOCATIONS FOR MANUFACTURING A LAMINATED COMPOSITE COMPONENT

(71) Applicant: The Boeing Company, Chicago, IL (US)

(72) Inventors: Adriana W. Blom-Schieber, Snohomish, WA (US); Christopher Loesche, Bothell, WA (US)

(73) Assignee: The Boeing Company, Chicago, IL (US)

( * ) Notice: Subject to any disclaimer, the term of this patent is extended or adjusted under 35 U.S.C. 154(b) by 968 days.

(21) Appl. No.: 17/963,672

(22) Filed: Oct. 11, 2022

(65) Prior Publication Data
US 2024/0119192 A1     Apr. 11, 2024

(51) Int. Cl.
G06F 30/20          (2020.01)
B29C 70/38          (2006.01)
(Continued)

(52) U.S. Cl.
CPC .............. G06F 30/20 (2020.01); G06F 30/10 (2020.01); G06F 2113/26 (2020.01); G06F 2119/18 (2020.01)

(58) Field of Classification Search
CPC ...... G06F 30/20; G06F 30/10; G06F 2113/26; G06F 2119/18; G06F 2111/04;
(Continued)

(56) References Cited

U.S. PATENT DOCUMENTS 10,467,350 B2     11/2019   Kang et al.
2009/0199948 A1*   8/2009   Kisch ..................... B29C 70/382
156/64
(Continued)

FOREIGN PATENT DOCUMENTS

CN          111832172          10/2020

OTHER PUBLICATIONS

Rousseau et al., "Automated Fiber Placement Path Planning: A state-of-the-art review" Computer-Aided Design & Applications, 16(2), 2019, pp. 172-203 [retrieved from https://www.cad-journal.net/files/vol_16/CAD_16(2)_2019_172-203.pdf]. (Year: 2019).*
(Continued)

*Primary Examiner* — Brian W Wathen
(74) *Attorney, Agent, or Firm* — Yee & Associates, P.C.

(57) ABSTRACT

The present disclosure is directed to methods and system for determining fiber placement start locations for manufacturing a laminated composite component. The method includes one or more processors accessing a computer geometric model of the laminated composite component, which includes various characteristics of the component that will be generated. Then, the processors break individual plies of the model into different groups. For each of the groups of plies, stagger requirements are determined and an algorithm (e.g., an integer optimization algorithm or other method described herein) for resolving the stagger requirements is executed. A three dimensional fiber placement start location for each ply in the group is then calculated based on the output from the executed algorithm, a reference curve determined on a definition surface, and a geodesic curve on the surface that is normal to the definition surface.

20 Claims, 16 Drawing Sheets

480

ACCESSING, BY ONE OR MORE PROCESSORS IN COMMUNICATION WITH A NON-TRANSITORY COMPUTER READABLE MEDIUM HAVING EXECUTABLE INSTRUCTIONS STORED THEREIN, A COMPUTER GEOMETRIC MODEL OF THE LAMINATED COMPOSITE COMPONENT, THE COMPUTER GEOMETRIC MODEL COMPRISING DATA CHARACTERIZING PARAMETERS OF THE LAMINATED COMPOSITE COMPONENT, THE DATA INCLUDING: A LAMINATE DEFINITION INCLUDING THE PLURALITY OF PLIES, EACH OF THE PLURALITY OF PLIES DEFINED BY A PLY ORIENTATION AND A PLY BOUNDARY; AND DATA CHARACTERIZING A DEFINITION SURFACE COMPRISING A PREDETERMINED SURFACE OF THE REGION ON WHICH THE PLY BOUNDARIES ARE DEFINED.       —402

ANALYZING THE COMPUTER GEOMETRIC MODEL, BY THE ONE OR MORE PROCESSORS, AND GROUPING ALL PLIES OF THE PLURALITY OF PLIES THAT HAVE A SAME PLY ORIENTATION INTO ONE OR MORE GROUPS.       —404

DETERMINING A REFERENCE CURVE ON THE DEFINITION SURFACE FOR THE PLY ORIENTATION OF THE GROUP BASED ON THE PLY ORIENTATION AND THE DATA CHARACTERIZING THE DEFINITION SURFACE.       —406

DETERMINING, FOR EACH OF THE PLIES IN THE GROUP, A GEODESIC CURVE ON THE DEFINITION SURFACE NORMAL TO THE REFERENCE CURVE.       —408

DIVIDING THE DEFINITION SURFACE INTO STACKING AREAS THAT EACH HAVE AN IDENTICAL SET OF PLIES THROUGH A THICKNESS OF THE PLURALITY OF PLIES OF THE GROUP.       —410

DETERMINING, FROM THE LAMINATE DEFINITION AND FOR EACH OF THE STACKING AREAS, STAGGER REQUIREMENTS BETWEEN TWO PLIES OF THE IDENTICAL SET OF PLIES OF THE STACKING AREAS, WHEREIN STAGGER IS DEFINED AS A NORMALIZED DIFFERENCE IN DISTANCE ALONG THE GEODESIC CURVE BETWEEN A FIRST FIBER PLACEMENT START LOCATION OF A FIRST PLY IN THE IDENTICAL SET OF PLIES AND A SECOND FIBER PLACEMENT START LOCATION OF A SECOND PLY IN THE IDENTICAL SET OF PLIES, WHEREIN THE NORMALIZED DIFFERENCE IS WITH RESPECT TO THE FINITE WIDTH OF FIBER MATERIAL OF A COURSE OF THE FIRST PLY OR THE SECOND PLY.       —412

DEFINING A DISCRETE SET OF POSSIBLE DISTANCES ALONG THE GEODESIC CURVE FOR THE FIBER PLACEMENT START LOCATION OF EACH PLY IN THE GROUP.       —414

DETERMINING A SET OF CANDIDATE FIBER PLACEMENT START LOCATIONS FOR EACH PLY IN THE GROUP BASED ON THE DISCRETE SET OF POSSIBLE DISTANCES.       —416

(51) Int. Cl.
    G06F 30/10         (2020.01)
    *G06F 113/26*      (2020.01)
    *G06F 119/18*      (2020.01)

(58) Field of Classification Search
    CPC .... G06F 2111/10; G06F 30/15; B29C 70/382;
                                      B29C 70/38
    See application file for complete search history.

(56)             References Cited

U.S. PATENT DOCUMENTS

| | | | | |
|---|---|---|---|---|
| 2013/0103359 | A1* | 4/2013 | Grandine | G06F 30/00 |
| | | | | 703/1 |
| 2016/0052214 | A1* | 2/2016 | Gilbert | B29C 70/30 |
| | | | | 156/64 |
| 2017/0228473 | A1* | 8/2017 | Kang | G06F 30/00 |
| 2018/0284724 | A1* | 10/2018 | Moruzzi | B29C 70/384 |
| 2018/0304557 | A1* | 10/2018 | Barnes | G05B 19/4097 |
| 2019/0155252 | A9 | 5/2019 | Moruzzi et al. | |
| 2019/0286788 | A1* | 9/2019 | Thompson | G06F 30/15 |
| 2020/0147904 | A1* | 5/2020 | Yarker | B29C 70/02 |

OTHER PUBLICATIONS

CGTech Vericut, Composite Applications. USA, Corporate Headquarters, 2018, Irvine, CA, USA 92618. Retrieved from the Internet <URL: chrome-extension://efaidnbmnnnibpcajpcglclefindmkaj/ https://www.cgtech.com/images/pdf/Composites-8.1-MultiFold-WEB. pdf>.
CATFiber Software. Coriolis Software Solutions Products. Retrieved from the Internet on Oct. 11, 2022 <URL: https://www.coriolis-composites.com/software-solutions/products/cat/>.
Brasington, Alex, et al., "Bayesian optimization for process planning selections in automated fiber placement," Journal of Composite Materials, vol. 56, No., 28, Sep. 29, 2022, pp. 4275-4296, XP093132991.
Rousseau, Guillaume, et al., "Automated Fiber Placement Path Planning: A state-of-the-art review," Computer-Aided Design and Applications, vol. 16, No. 2, Dec. 31, 2019, pp. 172-203, XP093132996.
Extended European Search Report issued Mar. 4, 2024, in corresponding European application No. 23195615.2.

* cited by examiner

250

300

| Ply | SA1 | SA2 | SA3 | SA4 | SA5 |
|-----|-----|-----|-----|-----|-----|
| Ply. 1 | X | X | X | X | X |
| Ply. 2 | X | X | X | X | X |
| Ply. 3 | X | X | X | X | X |
| Ply. 4 | X | X | X | X | X |
| Ply. 5 | X | X | X | X | X |
| Ply. 6 | X | X | X | X | X |
| Ply. 7 | X | X | X | X | X |
| Ply. 8 | X | X | X | X | X |
| Ply. 9 | | | | | |
| Ply. 10 | X | X | X | X | X |
| Ply. 11 | | | | | |
| Ply. 12 | X | X | X | X | X |
| Ply. 13 | | | | | |
| Ply. 14 | X | X | X | X | X |
| Ply. 15 | X | X | X | X | |
| Ply. 16 | X | X | X | X | |
| Ply. 17 | X | X | X | | |
| Ply. 18 | X | X | | | |
| Ply. 19 | X | | | | |
| Ply. 20 | X | X | X | | |
| Ply. 21 | X | X | X | X | |
| Ply. 22 | X | X | X | X | |
| Ply. 23 | X | X | X | X | X |
| Ply. 24 | X | X | X | X | X |
| Ply. 25 | | | | | |
| Ply. 26 | X | X | X | X | X |
| Ply. 27 | | | | | |
| Ply. 28 | X | X | X | X | X |
| Ply. 29 | | | | | |
| Ply. 30 | X | X | X | X | X |
| Ply. 31 | X | X | X | X | X |
| Ply. 32 | X | X | X | X | X |
| Ply. 33 | X | X | X | X | X |
| Ply. 34 | X | X | X | X | X |
| Ply. 35 | X | X | X | X | X |
| Ply. 36 | X | X | X | X | X |

FIBER
DIRECTION

TOWS OF PLY
1 SHIFTED
FROM THE
TOWS OF PLY
2 BY 0.5 TOW
WIDTH

FIBER
DIRECTION

400

ACCESSING, BY ONE OR MORE PROCESSORS IN COMMUNICATION WITH A NON-TRANSITORY COMPUTER READABLE MEDIUM HAVING EXECUTABLE INSTRUCTIONS STORED THEREIN, A COMPUTER GEOMETRIC MODEL OF THE LAMINATED COMPOSITE COMPONENT, THE COMPUTER GEOMETRIC MODEL COMPRISING DATA CHARACTERIZING PARAMETERS OF THE LAMINATED COMPOSITE COMPONENT, THE DATA INCLUDING: A LAMINATE DEFINITION INCLUDING THE PLURALITY OF PLIES, EACH OF THE PLURALITY OF PLIES DEFINED BY A PLY ORIENTATION AND A PLY BOUNDARY; AND DATA CHARACTERIZING A DEFINITION SURFACE COMPRISING A PREDETERMINED SURFACE OF THE REGION ON WHICH THE PLY BOUNDARIES ARE DEFINED. — 402

ANALYZING THE COMPUTER GEOMETRIC MODEL, BY THE ONE OR MORE PROCESSORS, AND GROUPING ALL PLIES OF THE PLURALITY OF PLIES THAT HAVE A SAME PLY ORIENTATION INTO ONE OR MORE GROUPS. — 404

DETERMINING A REFERENCE CURVE ON THE DEFINITION SURFACE FOR THE PLY ORIENTATION OF THE GROUP BASED ON THE PLY ORIENTATION AND THE DATA CHARACTERIZING THE DEFINITION SURFACE. — 406

DETERMINING, FOR EACH OF THE PLIES IN THE GROUP, A GEODESIC CURVE ON THE DEFINITION SURFACE NORMAL TO THE REFERENCE CURVE. — 408

DIVIDING THE DEFINITION SURFACE INTO STACKING AREAS THAT EACH HAVE AN IDENTICAL SET OF PLIES THROUGH A THICKNESS OF THE PLURALITY OF PLIES OF THE GROUP. — 410

DETERMINING, FROM THE LAMINATE DEFINITION AND FOR EACH OF THE STACKING AREAS, STAGGER REQUIREMENTS BETWEEN TWO PLIES OF THE IDENTICAL SET OF PLIES OF THE STACKING AREAS, WHEREIN STAGGER IS DEFINED AS A NORMALIZED DIFFERENCE IN DISTANCE ALONG THE GEODESIC CURVE BETWEEN A FIRST FIBER PLACEMENT START LOCATION OF A FIRST PLY IN THE IDENTICAL SET OF PLIES AND A SECOND FIBER PLACEMENT START LOCATION OF A SECOND PLY IN THE IDENTICAL SET OF PLIES, WHEREIN THE NORMALIZED DIFFERENCE IS WITH RESPECT TO THE FINITE WIDTH OF FIBER MATERIAL OF A COURSE OF THE FIRST PLY OR THE SECOND PLY. — 412

DEFINING A DISCRETE SET OF POSSIBLE DISTANCES ALONG THE GEODESIC CURVE FOR THE FIBER PLACEMENT START LOCATION OF EACH PLY IN THE GROUP. — 414

DETERMINING A SET OF CANDIDATE FIBER PLACEMENT START LOCATIONS FOR EACH PLY IN THE GROUP BASED ON THE DISCRETE SET OF POSSIBLE DISTANCES. — 416

FIG. 4A 400
(CONT'D)

| POPULATING AN INTEGER OPTIMIZATION ALGORITHM WITH THE SET OF CANDIDATE FIBER PLACEMENT START LOCATIONS TO DETERMINE AN OPTIMIZATION SOLUTION INDICATING WHICH OF THE SET OF CANDIDATE FIBER PLACEMENT START LOCATIONS FOR EACH PLY IN THE GROUP COMPLIES WITH AN OBJECTIVE FUNCTION OF THE INTEGER OPTIMIZATION ALGORITHM AND ONE OR MORE CONSTRAINTS, THE OBJECTIVE FUNCTION OR THE ONE OR MORE CONSTRAINTS INCLUDING THE STAGGER REQUIREMENTS. | 418 |

| EXECUTING THE INTEGER OPTIMIZATION ALGORITHM TO OBTAIN THE OPTIMIZATION SOLUTION. | 420 |

| COMPUTING A THREE-DIMENSIONAL FIBER PLACEMENT START LOCATION FOR EACH PLY IN THE GROUP BASED ON THE OPTIMIZATION SOLUTION, THE REFERENCE CURVE, AND THE GEODESIC CURVE. | 422 |

FIG. 4B

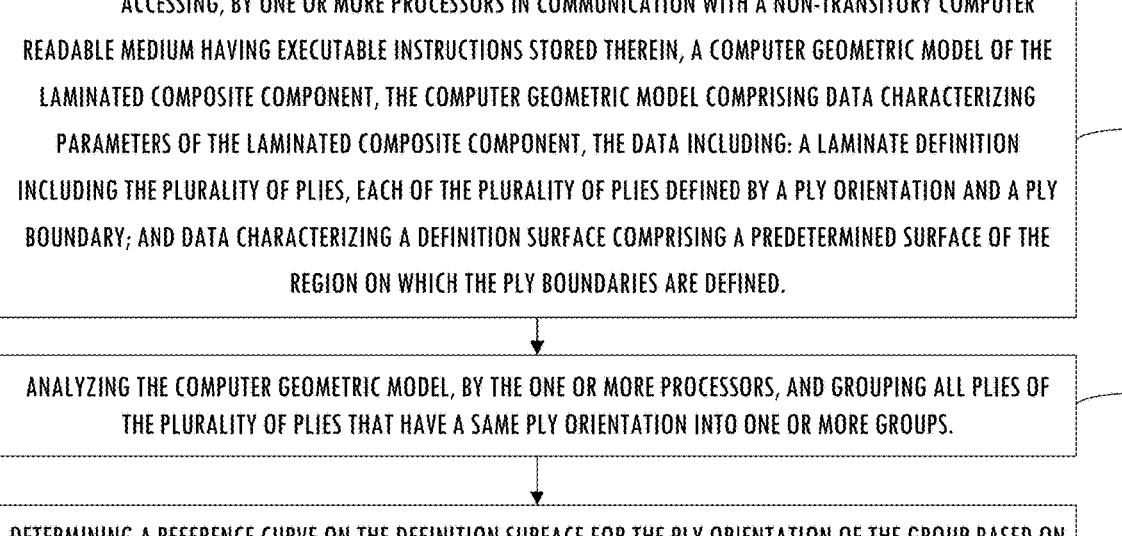

450

ACCESSING, BY ONE OR MORE PROCESSORS IN COMMUNICATION WITH A NON-TRANSITORY COMPUTER READABLE MEDIUM HAVING EXECUTABLE INSTRUCTIONS STORED THEREIN, A COMPUTER GEOMETRIC MODEL OF THE LAMINATED COMPOSITE COMPONENT, THE COMPUTER GEOMETRIC MODEL COMPRISING DATA CHARACTERIZING PARAMETERS OF THE LAMINATED COMPOSITE COMPONENT, THE DATA INCLUDING: A LAMINATE DEFINITION INCLUDING THE PLURALITY OF PLIES, EACH OF THE PLURALITY OF PLIES DEFINED BY A PLY ORIENTATION AND A PLY BOUNDARY; AND DATA CHARACTERIZING A DEFINITION SURFACE COMPRISING A PREDETERMINED SURFACE OF THE REGION ON WHICH THE PLY BOUNDARIES ARE DEFINED. — 452

ANALYZING THE COMPUTER GEOMETRIC MODEL, BY THE ONE OR MORE PROCESSORS, AND GROUPING ALL PLIES OF THE PLURALITY OF PLIES THAT HAVE A SAME PLY ORIENTATION INTO ONE OR MORE GROUPS. — 454

DETERMINING A REFERENCE CURVE ON THE DEFINITION SURFACE FOR THE PLY ORIENTATION OF THE GROUP BASED ON THE PLY ORIENTATION AND THE DATA CHARACTERIZING THE DEFINITION SURFACE. — 456

DETERMINING, FOR EACH OF THE PLIES IN THE GROUP, A GEODESIC CURVE ON THE DEFINITION SURFACE NORMAL TO THE REFERENCE CURVE. — 458

DIVIDING THE DEFINITION SURFACE INTO STACKING AREAS THAT EACH HAVE AN IDENTICAL SET OF PLIES THROUGH A THICKNESS OF THE PLURALITY OF PLIES OF THE GROUP. — 460

DETERMINING, FROM THE LAMINATE DEFINITION AND FOR EACH OF THE STACKING AREAS, STAGGER REQUIREMENTS BETWEEN TWO PLIES OF THE IDENTICAL SET OF PLIES OF THE STACKING AREAS, WHEREIN STAGGER IS DEFINED AS A NORMALIZED DIFFERENCE IN DISTANCE ALONG THE GEODESIC CURVE BETWEEN A FIRST FIBER PLACEMENT START LOCATION OF A FIRST PLY IN THE IDENTICAL SET OF PLIES AND A SECOND FIBER PLACEMENT START LOCATION OF A SECOND PLY IN THE IDENTICAL SET OF PLIES, WHEREIN THE NORMALIZED DIFFERENCE IS WITH RESPECT TO THE FINITE WIDTH OF FIBER MATERIAL OF A COURSE OF THE FIRST PLY OR THE SECOND PLY. — 462

DEFINING A DISCRETE SET OF POSSIBLE DISTANCES ALONG THE GEODESIC CURVE FOR THE FIBER PLACEMENT START LOCATION OF EACH PLY IN THE GROUP. — 464

DETERMINING A SET OF CANDIDATE FIBER PLACEMENT START LOCATIONS FOR EACH PLY IN THE GROUP BASED ON THE DISCRETE SET OF POSSIBLE DISTANCES. — 466

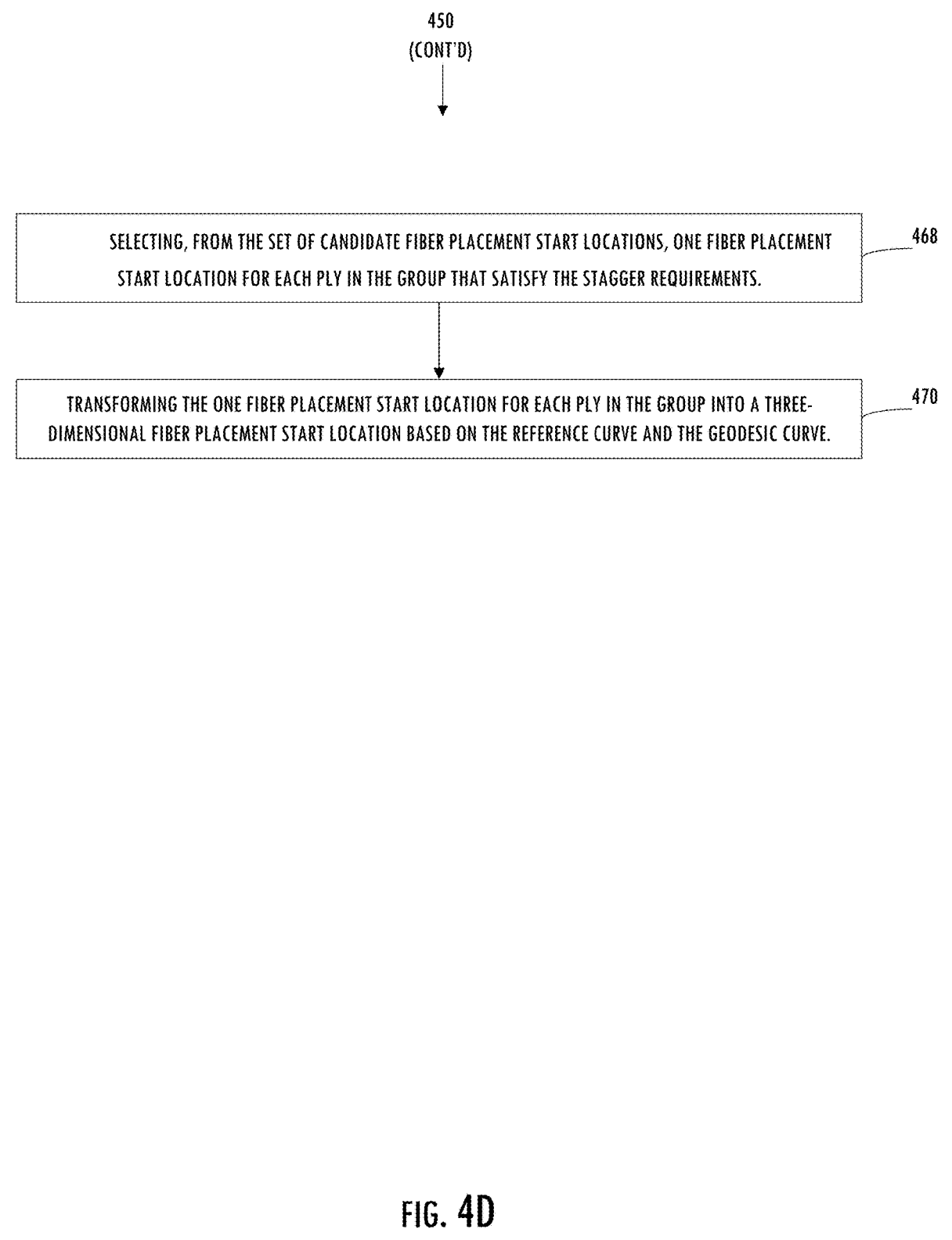

FIG. 4C 450
(CONT'D)

SELECTING, FROM THE SET OF CANDIDATE FIBER PLACEMENT START LOCATIONS, ONE FIBER PLACEMENT
START LOCATION FOR EACH PLY IN THE GROUP THAT SATISFY THE STAGGER REQUIREMENTS.          468

TRANSFORMING THE ONE FIBER PLACEMENT START LOCATION FOR EACH PLY IN THE GROUP INTO A THREE-
DIMENSIONAL FIBER PLACEMENT START LOCATION BASED ON THE REFERENCE CURVE AND THE GEODESIC CURVE.          470

FIG. 4D

METHODS AND SYSTEM FOR DETERMINING FIBER PLACEMENT START LOCATIONS FOR MANUFACTURING A LAMINATED COMPOSITE COMPONENT

BACKGROUND

Field of the Disclosure

The present disclosure is generally related to manufacturing composite components. More particularly, the present disclosure is related to numerical control (NC) programming for determining fiber placement start locations for manufacturing a laminated composite component.

Description of Related Art

Automated fiber placement (AFP) and automated tape laying (ATL) are methods that automate the layup of unidirectional composite material. Both are based on the concept of rolling out tape while passing over the surface of a component. The major distinctions between ATL and AFP are: 1) the width of the material that is placed on the surface, 2) the number of tapes that are placed in a single pass, and 3) the orientation at which the tape is cut. ATL places a single tape, with example widths of 6 inches or 12 inches, while it's possible to cut the tape under any angle. AFP on the other hand places multiple parallel tapes, called tows, in a single course, while these tows are only cut perpendicular to the fiber direction. Typical tow widths are ⅛ inch, ¼ inch, ½ inch, and 1½ inches, with the number of tows varying from 2 to 32. ATL is more suitable for relatively flat surfaces, because the larger tape widths are prone to wrinkling when placed on curved surfaces. AFP is more suitable for (highly) curved surfaces, but can be used on flat surfaces as well.

The concept of ply stagger was introduced due to the presence of gaps between adjacent courses and the risk these gaps form for the structural integrity of composite parts if they are aligned through a thickness of the layers of the composite part. Many composite component designs have specific stagger requirements meant to prevent structural integrity issues caused by the gaps aligning in the ply layers. In addition, depending on the fiber directions of the plies, the plies generate crenulated edges at boundaries of areas where fiber is applied to the composite part, or fiber otherwise hangs over the edge of the boundary of an area where fiber is applied.

It would therefore be desirable to have a system and method that takes into account at least some of the issues discussed above, as well as other possible issues.

SUMMARY

Example implementations of the present disclosure are directed to methods and system for determining fiber placement start locations for manufacturing a laminate composite component. The method includes one or more processors accessing a computer geometric model of the laminated composite component, which includes various characteristics of the component that will be generated. Then, the processors break individual plies of the model into different groups. For each of the groups of plies, stagger requirements are determined and an algorithm (e.g., an integer optimization algorithm or other method described herein) for resolving the stagger requirements is executed. A three dimensional fiber placement start location for each ply in the group is then calculated based on 1) the output from the executed algorithm, 2) a reference curve determined on a definition surface, and 3) a geodesic curve on the surface that is normal to the definition surface.

The present disclosure thus includes, without limitation, the following example implementations.

Some example implementations provide a method for determining fiber placement start locations for manufacturing a laminated composite component, the laminated composite component being manufactured by applying a plurality of plies to a region of the laminated composite component in a specified sequence, wherein each of the plurality of plies comprises a layer of fiber made up of one or more courses of fiber, each course of the one or more courses of fiber comprising a finite width of fiber material, the method comprising: accessing, by one or more processors in communication with a non-transitory computer readable medium having executable instructions stored therein, a computer geometric model of the laminated composite component, the computer geometric model comprising data characterizing parameters of the laminated composite component, the data including: a laminate definition including the plurality of plies, each of the plurality of plies defined by a ply orientation and a ply boundary; and data characterizing a definition surface comprising a predetermined surface of the region on which the ply boundaries are defined; and analyzing the computer geometric model, by the one or more processors, and grouping all plies of the plurality of plies that have a same ply orientation into one or more groups; for each of the one or more groups, the one or more processors: determining a reference curve on the definition surface for the ply orientation of the group based on the ply orientation and the data characterizing the definition surface; determining, for each of the plies in the group, a geodesic curve on the definition surface normal to the reference curve; dividing the definition surface into stacking areas that each have an identical set of plies through a thickness of the plurality of plies of the group; determining, from the laminate definition and for each of the stacking areas, stagger requirements between two plies of the identical set of plies of the stacking areas, wherein stagger is defined as a normalized difference in distance along the geodesic curve between a first fiber placement start location of a first ply in the identical set of plies and a second fiber placement start location of a second ply in the identical set of plies, wherein the normalized difference is with respect to the finite width of fiber material of a course of the first ply or the second ply; defining a discrete set of possible distances along the geodesic curve for the fiber placement start location of each ply in the group; determining a set of candidate fiber placement start locations for each ply in the group based on the discrete set of possible distances; populating an integer optimization algorithm with the set of candidate fiber placement start locations to determine an optimization solution indicating which of the set of candidate fiber placement start locations for each ply in the group complies with an objective function of the integer optimization algorithm and one or more constraints, the objective function or the one or more constraints including the stagger requirements; executing the integer optimization algorithm to obtain the optimization solution; and computing a three-dimensional fiber placement start location for each ply in the group based on the optimization solution, the reference curve, and the geodesic curve.

In some example implementations of the method of any preceding example implementation, or any combination thereof, the three-dimensional fiber placement start location for each ply is a point on the definition surface through which a centerline of a first course of fiber passes, after which, all other course placement locations in the ply are capable of being determined.

In some example implementations of the method of any preceding example implementation, or any combination thereof, further comprises receiving, by the one or more processors, data indicating a number of tows (n) in each of the one or more courses of fiber, a tow comprising a strip of fiber having a predefined tow width, wherein the finite width of the course is equal to the number of tows multiplied by the predefined tow width plus a nominal tow gap between each of the number of tows multiplied by n−1; and wherein the stagger requirements are determined to prohibit the normalized difference from being a multiple of the predefined tow width plus the nominal tow gap.

In some example implementations of the method of any preceding example implementation, or any combination thereof, determining the geodesic curve includes determining, for each of the plies in the group, a plurality of geodesic curves on the definition surface normal to the reference curve and determining intersections of each of the plurality of geodesic curves with the ply boundary, and for one of the plurality of geodesic curves, measuring a distance from the reference curve to the intersections of the one geodesic curve with the ply boundary to thereby determine a boundary edge of the ply; the method further comprising: shifting each of the candidate fiber placement start locations, in the set of candidate fiber placement start locations, for a ply in the group along the one geodesic curve by integer multiples of the finite width of fiber material to be within a threshold distance of the boundary edge of the ply and within the ply boundary.

In some example implementations of the method of any preceding example implementation, or any combination thereof, further comprises determining if any of the candidate fiber placement start locations in the set of candidate fiber placement start locations are capable of being eliminated to ensure that every candidate fiber placement start location in the set falls within the ply boundary.

In some example implementations of the method of any preceding example implementation, or any combination thereof, the integer optimization algorithm includes a constraint defined to ensure the three-dimensional fiber placement start location computed for each ply falls within the ply boundary.

In some example implementations of the method of any preceding example implementation, or any combination thereof, the ply orientation is defined by a fiber direction; and wherein the integer optimization algorithm includes either of: a constraint defined to ensure that an edge of one of the tows of one of the one or more courses contained within a ply in the group is aligned with the boundary edge of the ply, the boundary edge of the ply being parallel to the fiber direction of the ply; or an integer optimization definition defining the set of candidate fiber placement start locations such that each candidate fiber placement start location in the set is an integer multiple of the predefined tow width plus the nominal tow gap away from the boundary edge of the ply that is parallel to the fiber direction of the ply; and wherein the edge of the tow is aligned with the boundary edge of the ply in the group such that an angle between the edge of the tow and the boundary edge of the ply is less than a threshold angle, the angle and the threshold angle being different with respect to one another.

In some example implementations of the method of any preceding example implementation, or any combination thereof, the integer optimization algorithm includes: a constraint defined to ensure that crenulated edges of two plies within the group that share at least a portion of the ply boundary are complimentary, complimentary being defined as arranging the two plies such that crenulated edges of a first of the two plies are not aligned with crenulated edges of a second of the two plies; or defining the set of candidate fiber placement start locations such that a first candidate fiber placement start location in the set for a first ply in the group is separated from a second candidate fiber placement start location in the set for a second ply in the group by an integer-plus-a-half multiple of the predefined tow width.

In some example implementations of the method of any preceding example implementation, or any combination thereof, further comprises the integer optimization algorithm biasing the optimization solution based on either or both of: a surface area of a stacking area of the stacking areas; and a number of plies within the stacking area.

In some example implementations of the method of any preceding example implementation, or any combination thereof, the ply orientation is defined by a rosette and a fiber angle, and the reference curve is further determined based on the ply orientation; wherein determining the geodesic curve includes determining, for each of the plies in the group, a plurality of geodesic curves on the definition surface normal to the reference curve and determining intersections of each of the plurality of geodesic curves with the ply boundary; wherein defining the discrete set of possible distances includes defining a discrete set of possible distances along the plurality of geodesic curves; wherein the normalized difference is measured along the geodesic curve of the plurality of geodesic curves that is normal to the reference curve for the ply orientation of the group; and wherein computing the three-dimensional fiber placement start location for each ply is further based on the ply boundary in the laminate definition.

In some example implementations of the method of any preceding example implementation, or any combination thereof, the laminate definition further includes a series of ordered sequences of plies through a thickness of the region of the laminated composite component in which the plurality of plies are contained; and wherein the stagger requirements define a minimum distance between the candidate fiber placement start locations of a first ply and the candidate fiber placement start locations of other plies in the same group that are separated by less than a predetermined number of plies in any of the stacking areas of the group.

In some example implementations of the method of any preceding example implementation, or any combination thereof, the integer optimization algorithm includes: an integer optimization definition defining the set of candidate fiber placement start locations for each ply in the group such that each three-dimensional fiber placement start location for each ply is evenly spaced apart with respect to each other through a thickness of the plies in the group.

In some example implementations of the method of any preceding example implementation, or any combination thereof, each of the one or more courses of fiber is applied with a single pass of a fiber applicator; and wherein the fiber applicator is an automated fiber placement machine or an automated tape layer, and the method further comprises the one or more processors, or another computing device, generating instructions, based on the three-dimensional fiber placement start location for each ply in the group, for the automated fiber placement machine or the automated tape layer for automatically applying fiber to the region to create the laminated composite component.

In some example implementations of the method of any preceding example implementation, or any combination thereof, each of the one or more courses of fiber is applied with a single pass of a fiber applicator; and wherein the fiber applicator is a hand fiber applicator and the method further comprises: the one or more processors, or another computing device, determining a location of boundaries of each of the one or more courses of each ply based on the three-dimensional fiber placement start location for each ply; determining a shape of each of the one or more courses of each ply based on the location of the boundaries of each of the one or more courses of each ply; and transmitting the shape of each of the one or more courses to a laser projector for projecting the shape of each course onto a surface of the laminated composite component for a user to apply fiber using the hand fiber applicator.

Some other example implementations provide a system for determining fiber placement start locations for manufacturing a laminated composite component, the laminated composite component being manufactured by applying a plurality of plies to a region of the laminated composite component in a specified sequence, wherein each of the plurality of plies comprises a layer of fiber made up of one or more courses of fiber, each course of the one or more courses of fiber comprising a finite width of fiber material, the system comprising: one or more processors in communication with a non-transitory computer readable medium having executable instructions stored therein, that when executed causes the one or more processors to: access a computer geometric model of the laminated composite component, the computer geometric model comprising data characterizing parameters of the laminated composite component, the data including: a laminate definition including the plurality of plies, each of the plurality of plies defined by a ply orientation and a ply boundary; and data characterizing a definition surface comprising a predetermined surface of the region on which the ply boundaries are defined; analyze the computer geometric model and group all plies of the plurality of plies that have a same ply orientation into one or more groups; for each of the one or more groups, the one or more processors further caused to: determine a reference curve on the definition surface for the ply orientation of the group based on the ply orientation and the data characterizing the definition surface; determine, for each of the plies in the group, a geodesic curve on the definition surface normal to the reference curve; divide the definition surface into stacking areas that each have an identical set of plies through a thickness of the plurality of plies of the group; determine, from the laminate definition and for each of the stacking areas, stagger requirements between two plies of the identical set of plies of the stacking areas, wherein stagger is defined as a normalized difference in distance along the geodesic curve between a first fiber placement start location of a first ply in the identical set of plies and a second fiber placement start location of a second ply in the identical set of plies, wherein the normalized difference is with respect to the finite width of fiber material of a course of the first ply or the second ply; define a discrete set of possible distances along the geodesic curve for the fiber placement start location of each ply in the group; determine a set of candidate fiber placement start locations for each ply in the group based on the discrete set of possible distances; populate an integer optimization algorithm with the set of candidate fiber placement start locations to determine an optimization solution indicating which of the set of candidate fiber placement start locations for each ply in the group complies with an objective function of the integer optimization algorithm and one or more constraints, the objective function or the one or more constraints including the stagger requirements; execute the integer optimization algorithm to obtain the optimization solution; and compute a three-dimensional fiber placement start location for each ply in the group based on the optimization solution, the reference curve, and the geodesic curve.

Some other example implementations provide a method for determining fiber placement start locations for manufacturing a laminated composite component, the laminated composite component being manufactured by applying a plurality of plies to a region of the laminated composite component in a specified sequence, wherein each of the plurality of plies comprises a layer of fiber made up of one or more courses of fiber, each course of the one or more courses of fiber comprising a finite width of fiber material, the method comprising: accessing, by one or more processors in communication with a non-transitory computer readable medium having executable instructions stored therein, a computer geometric model of the laminated composite component, the computer geometric model comprising data characterizing parameters of the laminated composite component, the data including: a laminate definition including the plurality of plies, each of the plurality of plies defined by a ply orientation and a ply boundary; and data characterizing a definition surface comprising a predetermined surface of the region on which the ply boundaries are defined; and analyzing the computer geometric model, by the one or more processors, and grouping all plies of the plurality of plies that have a same ply orientation into one or more groups; for each of the one or more groups, the one or more processors: determining a reference curve on the definition surface for the ply orientation of the group based on the ply orientation and the data characterizing the definition surface; determining, for each of the plies in the group, a geodesic curve on the definition surface normal to the reference curve; dividing the definition surface into stacking areas that each have an identical set of plies through a thickness of the plurality of plies of the group; determining, from the laminate definition and for each of the stacking areas, stagger requirements between two plies of the identical set of plies of the stacking areas, wherein stagger is defined as a normalized difference in distance along the geodesic curve between a first fiber placement start location of a first ply in the identical set of plies and a second fiber placement start location of a second ply in the identical set of plies, wherein the normalized difference is with respect to the finite width of fiber material of a course of the first ply or the second ply; defining a discrete set of possible distances along the geodesic curve for the fiber placement start location of each ply in the group; determining a set of candidate fiber placement start locations for each ply in the group based on the discrete set of possible distances; selecting, from the set of candidate fiber placement start locations, one fiber placement start location for each ply in the group that satisfy the stagger requirements; and transforming the one fiber placement start location for each ply in the group into a three-dimensional fiber placement start location based on the reference curve and the geodesic curve.

In some example implementations of the method of any preceding example implementation, or any combination thereof, further comprises receiving, by the one or more processors, data indicating a number of tows (n) in each of the one or more courses of fiber, a tow comprising a strip of fiber having a predefined tow width, wherein the finite width of the course is equal to the number of tows multiplied by the predefined tow width plus a nominal tow gap between each of the number of tows multiplied by n−1; and wherein the stagger requirements are determined to prohibit the normalized difference from being a multiple of the predefined tow width plus the nominal tow gap.

In some example implementations of the method of any preceding example implementation, or any combination thereof, determining the geodesic curve includes determining, for each of the plies in the group, a plurality of geodesic curves on the definition surface normal to the reference curve and determining intersections of each of the plurality of geodesic curves with the ply boundary, and for one of the plurality of geodesic curves, measuring a distance from the reference curve to the intersections of the one geodesic curve with the ply boundary to thereby determine a boundary edge of the ply; the method further comprising: shifting each of the candidate fiber placement start locations, in the set of candidate fiber placement start locations, for a ply in the group along the one geodesic curve by integer multiples of the finite width of fiber material to be within a threshold distance of the boundary edge of the ply and within the ply boundary.

In some example implementations of the method of any preceding example implementation, or any combination thereof, wherein the ply orientation is defined by a fiber direction; wherein selecting the one fiber placement start location for each ply in the group includes: selecting the one fiber placement start location for each ply to ensure that an edge of one of the tows of one of the one or more courses contained within a ply in the group is aligned with the boundary edge of the ply, the boundary edge of the ply being parallel to the fiber direction of the ply; or defining the set of candidate fiber placement start locations to obtain a defined set of candidate fiber placement start locations such that each candidate fiber placement start location in the set is an integer multiple of the predefined tow width plus the nominal tow gap away from the boundary edge of the ply that is parallel to the fiber direction of the ply, and selecting, for each ply in the group, any candidate fiber placement start location from the defined set as the one fiber placement start location; and wherein the edge of the tow is aligned with the boundary edge of the ply in the group such that an angle between the edge of the tow and the boundary edge of the ply is less than a threshold angle, the angle and the threshold angle being different with respect to one another.

In some example implementations of the method of any preceding example implementation, or any combination thereof, selecting the one fiber placement start location for each ply in the group includes: selecting the one fiber placement start location for each ply to ensure that crenulated edges of two plies within the group that share at least a portion of the ply boundary are complimentary, complimentary being defined as arranging the two plies such that crenulated edges of a first of the two plies are not aligned with crenulated edges of a second of the two plies; or defining the set of candidate fiber placement start locations to obtain a defined set of candidate fiber placement start locations such that a first candidate fiber placement start location in the defined set for a first ply in the group is separated from a second candidate fiber placement start location in the defined set for a second ply in the group by an integer-plus-a-half multiple of the predefined tow width, and selecting, for each ply in the group, any candidate fiber placement start location from the defined set as the one fiber placement start location.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 3A is an example table illustrating sets of plies that are analyzed, according to some embodiments of the present disclosure;

FIGS. 4A-4D illustrate flow charts detailing steps of example methods, according to some embodiments of the present disclosure.

DETAILED DESCRIPTION OF THE DISCLOSURE

Figure 1A:
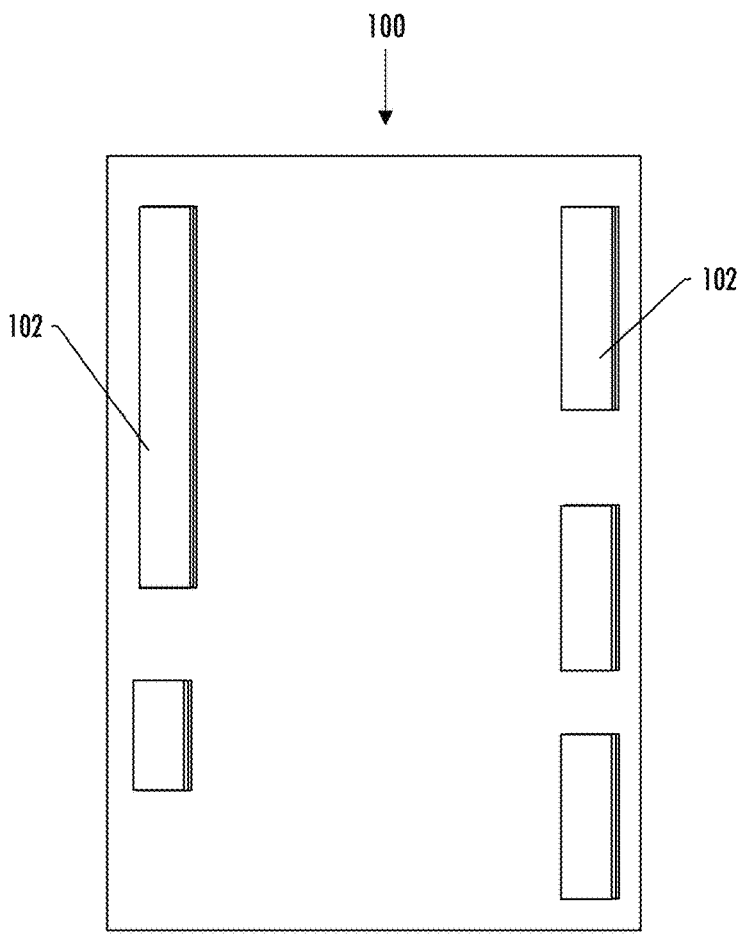
FIG. 1A illustrates an example laminated composite component and FIG. 1B illustrates an example course of fiber, according to some embodiments of the present disclosure.

Some examples of the present disclosure will now be described more fully hereinafter with reference to the accompanying drawings, in which some, but not all aspects of the disclosure are shown. Indeed, various examples of the disclosure are embodied in many different forms and should not be construed as limited to the examples set forth herein; rather, these examples are provided so that this disclosure will be thorough and complete, and will fully convey the scope of the disclosure to those skilled in the art. For example, unless otherwise indicated, reference to something as being a first, second or the like should not be construed to imply a particular order. Also, something described as being above something else (unless otherwise indicated) is instead below, and vice versa; and similarly, something described as being to the left of something else is instead to the right, and vice versa. Like reference numerals refer to like elements throughout.

Figure 1B:
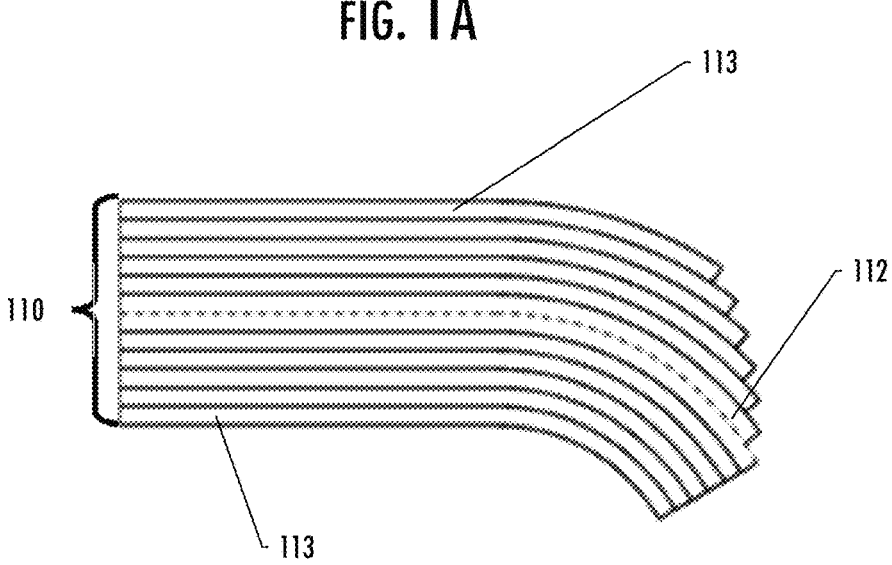

The present disclosure includes methods and systems for determining fiber placement start locations for manufacturing a laminated composite component. FIG. 1A illustrates an example laminated composite component 100. The laminated composite component is manufactured by applying a plurality of plies to a region 102 of the laminated composite component. As illustrated in FIG. 1A, each of the regions includes a stack or layers of plies in a specified sequence. Each ply comprises a layer of fiber made up of one or more courses of fiber. FIG. 1B illustrates an example course 110 of fiber. Each course of fiber is created by a single pass of a fiber applicator machine (e.g., an automated fiber applicator machine or a hand fiber applicator machine) and one or more courses are applied in a single layer to create a ply.

As illustrated in FIG. 1B, each course 110 has a centerline 112. The fiber placement start locations described herein are start locations indicating where the centerline for a first course of a single ply will start. Each course includes a finite width of fiber material and includes one or more tows 113. Each tow is a strip of fiber having a predefined tow width. The finite width of the course is equal to the number (n) of tows multiplied by the predefined tow width plus a nominal tow gap between each of the number of tows multiplied by n−1. The finite width of fiber material can be represented by Equation 1 below.

$$w_{course} = (w_{tow} \times n_{tows}) + (w_{gap} \times (n_{tows}-1)) \qquad \text{(Equation 1)}$$

Where $w_{course}$ is the finite width of fiber material that makes up the course, $w_{tow}$ is the width of each tow in the course, $n_{tows}$ is the number of tows in the course, and $w_{gap}$ is the nominal tow gap between each of the tows.

For example, the course in FIG. 1B includes twelve (12) tows, each being one (1) centimeter in width (i.e., measured perpendicular to the centerline), and there is a one (1) millimeter nominal tow gap between each of the tows. Therefore, the finite width of fiber material in the course in the example provided in FIG. 1B is 12 cm (n=12; 12 tows×1 cm) plus 11 mm (n−1=11; 11 tows×1 mm), or about 13.1 cm finite width for the course.

Figure 1C:
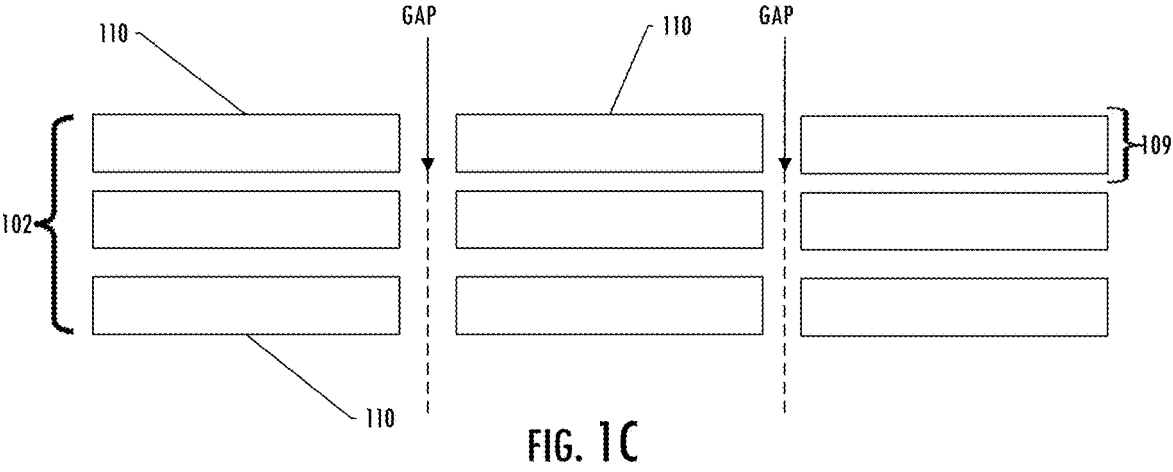
FIGS. 1C and 1D illustrate various cross-sectional views of a stack of plies of fiber, according to some embodiments of the present disclosure.
Figure 1D:
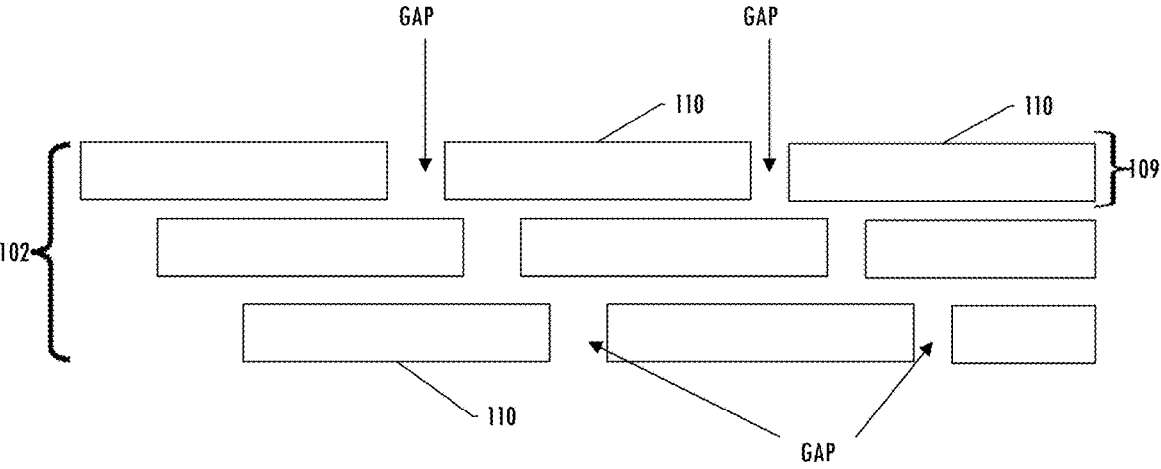

FIG. 1C illustrates a cross sectional view (perpendicular to the fiber direction) of three plies 109 with identical fiber orientation and stacked on top of each other. Each ply contains three courses 110 with a gap between each course. As shown in the figure, the gaps for each ply align. In some instances, this causes part integrity issues at the gaps because the component has a weak point at the gap. One way to avoid or minimize these weak points is to stagger the gaps as shown in FIG. 1D. If the courses of the plies are shifted appropriately, the gaps will not align, minimizing weak points where the component might break. However, determining how to stagger the courses properly, especially at boundaries of the regions 102 where courses are applied is quite labor intensive and is difficult to determine by hand.

Figure 1E:
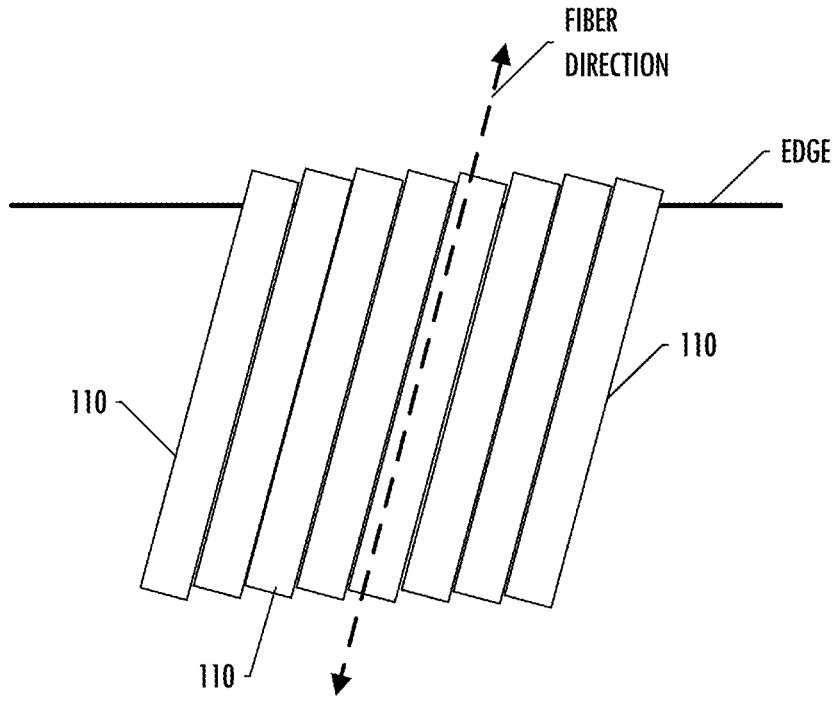
FIGS. 1E and 1F illustrates various top views of a boundary edge of a stack of plies of fiber, according to some embodiments of the present disclosure.
Figure 1F:
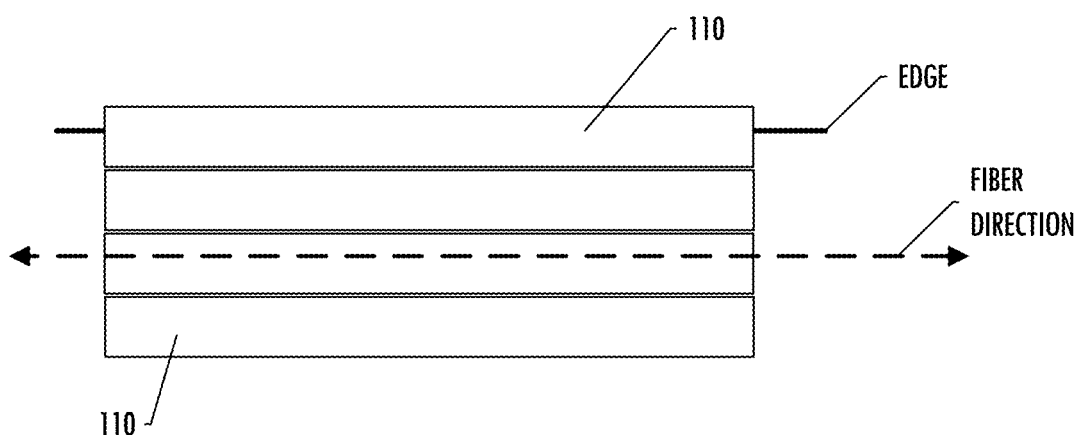

As illustrated in FIGS. 1E and 1F, depending on the fiber direction (e.g., direction of the course(s)) compared to the edge of the region, the as-manufactured plies include crenulated edges because the tows are cut perpendicular to the fiber direction, like that shown in FIG. 1E or a portion of a course hangs over the edge of the as-designed region as shown in FIG. 1F, because the tows have a fixed width. Both of these issues cause a discrepancy between the as-designed and as-manufactured ply boundaries that can result in irregular surfaces of the laminated composite component 100 being manufactured, which may cause indications during non-destructive inspection or assembly challenges due to mismatches with other components that have to be assembled with the laminated composite component 100.

As described hereinbelow, the systems and methods described herein are provided to determine fiber placement start locations that take into consideration each of these possible issues and maximizes conformance with stagger requirements and minimizes waste as described above.

Figure 2A:
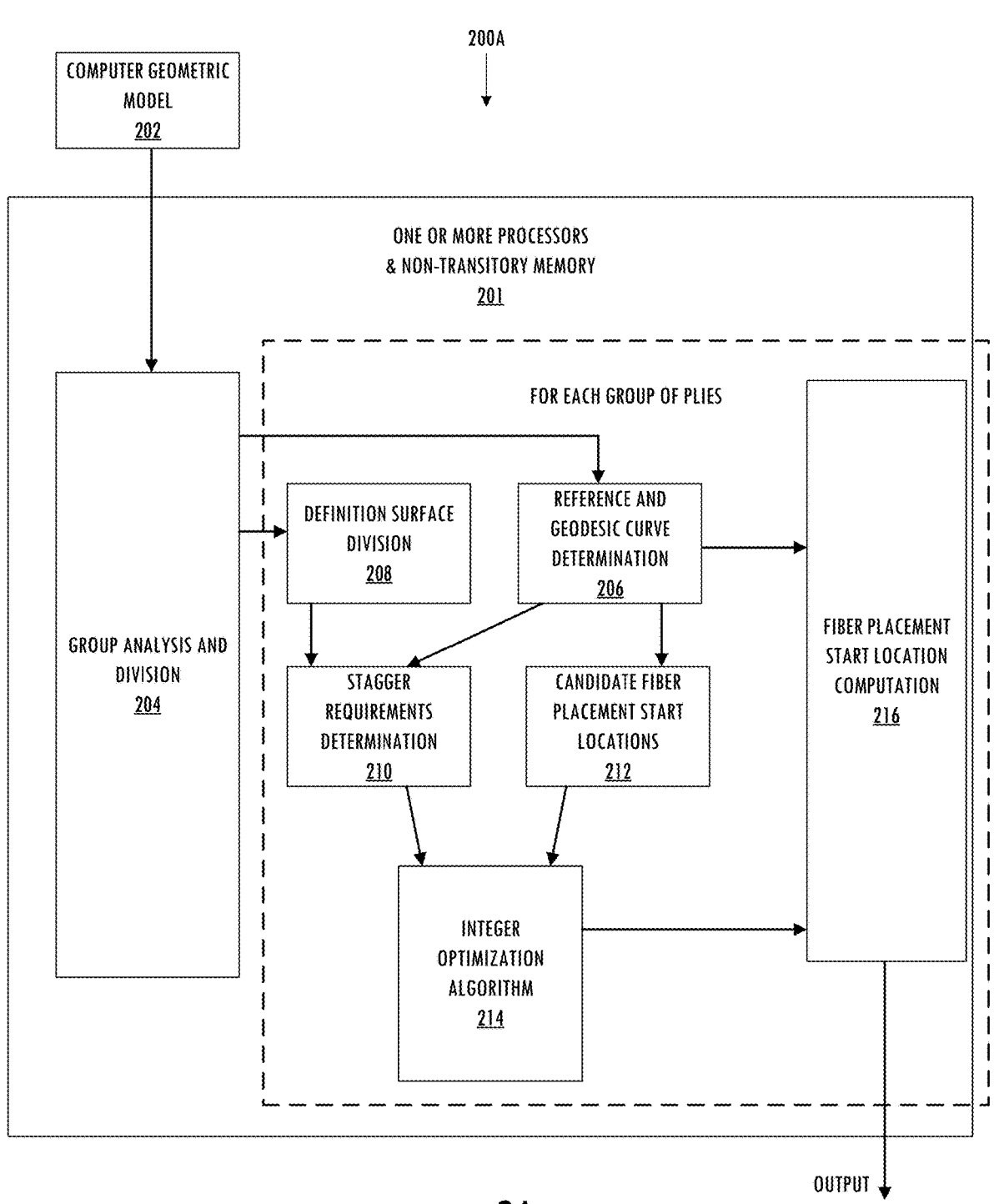
FIG. 2A illustrates a block diagram of an example system for determining fiber placement start locations for manufacturing a laminated composite component, according to some embodiments of the present disclosure.

FIG. 2A illustrates an example first system 200A for determining fiber placement start locations for manufacturing a laminated composite component such as the one illustrated in FIG. 1A. The first system includes one or more processors 201 in communication with a non-transitory computer readable medium having executable instructions stored therein. Upon execution of the executable instructions, the one or more processors are configured to access a computer geometric model 202 (e.g., CAD drawing or other suitable file) of the laminated composite component. In some implementations, the computer geometric model includes data characterizing parameters of the laminated composite component. As described above, the laminated composite component is manufactured by applying a plurality of plies to a region of the laminated composite component in a specified sequence. Furthermore, each of the plurality of plies comprises a layer of fiber made up of one or more courses of fiber, each course of the one or more courses of fiber comprising a finite width of fiber material. The data includes a laminate definition including the plurality of plies, each of the plurality of plies defined by a ply orientation and a ply boundary, and data characterizing a definition surface comprising a predetermined surface of the region on which the ply boundaries are defined.

The first system 200A includes a group analysis and division block 204 configured to analyze the computer geometric model 202 and group all plies of the plurality of plies that have a same ply orientation into one or more groups. In some implementations the ply orientation is defined by a rosette and a fiber angle. In other implementations the ply orientation may be defined by a vector field on the surface. The fiber angle is the angle between the direction of the course(s) for a ply and the laminate direction (or 0-degree direction), which is often defined to be aligned with the major load direction. The rosette is a coordinate axis system in space. In some implementations the laminate direction may be determined by projecting the rosette X-axis onto a surface of the laminated composite component. The fiber direction within the ply is then defined by rotating from the laminate direction over the fiber angle with respect to a surface normal.

Figure 3B:
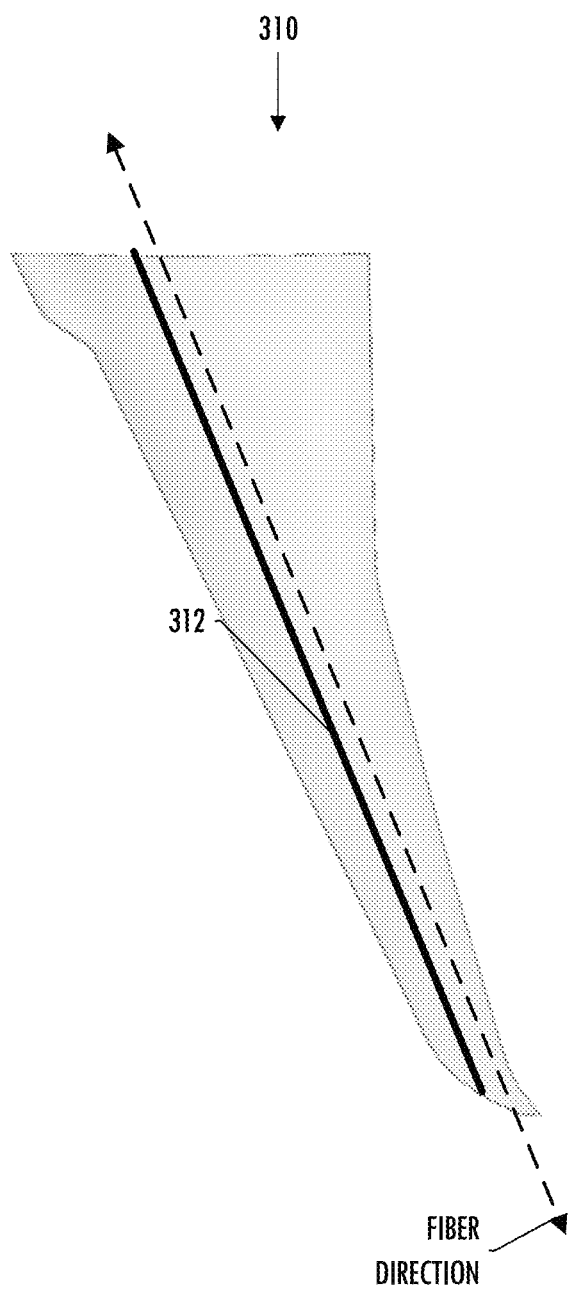
FIGS. 3B-3E illustrate various views of a model of a component with various manipulations thereon depicting some steps with which the system of the present disclosure determines the fiber placement start locations, according to some embodiments of the present disclosure.
Figure 3C:
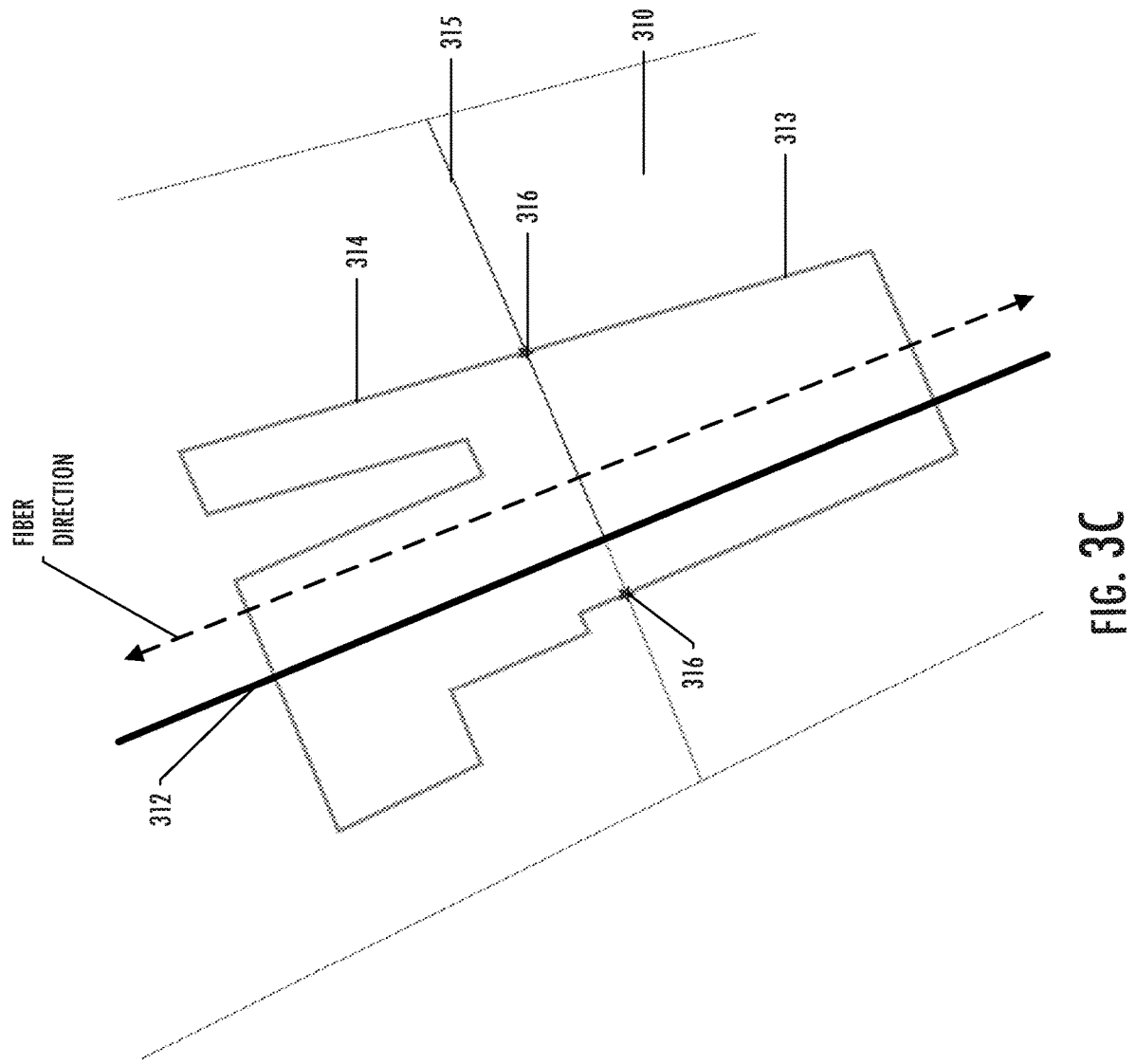

As illustrated using the dotted line, each of the system blocks described below perform their various functions for each of the one or more groups that the group analysis and division block 204 generates. Accordingly, while the following description refers to "the group", the first system 200A actually performs each of the steps below for each group identified by the group analysis and division block 204 to thereby determine fiber placement start locations for each ply that makes of the laminated composite component. In some implementations, the first system includes a reference and geodesic curve determination block 206 that is configured to determine a reference curve on the definition surface for the ply orientation of the group based on the ply orientation and the data characterizing the definition surface. An example of a reference curve overlaid on a definition surface is illustrated in FIG. 3B described below. The reference and geodesic curve determination block is further configured to determine, for each of the plies in the group, a geodesic curve on the definition surface normal to the reference curve. The drawing of a geodesic curve normal to the reference curve is illustrated in FIG. 3C below.

In some implementations, the first system 200A includes a definition surface division block 208 configured to divide the definition surface into stacking areas that each have an identical set of plies through a thickness of the plurality of plies of the group. By "thickness of the plurality of plies of the group", the present disclosure is referring to a layered stack of plies of the group.

In some implementations, the first system 200A includes a stagger requirements determination block 210 configured to determine, from the laminate definition and for each of the stacking areas (e.g., received from the definition surface division block 208), stagger requirements between two plies of the identical set of plies of the stacking areas. In some implementations, stagger is defined as a normalized difference in distance along the geodesic curve between a first fiber placement start location of a first ply in the identical set of plies and a second fiber placement start location of a second ply in the identical set of plies, wherein the normalized difference is with respect to the course width (i.e., the finite width of fiber).

In some example implementations, the one or more processors 201 are further configured to receive data (e.g., from the computer geometric model 202 or an input from a fiber application machine or other apparatus) indicating a number of tows (n) in each of the one or more courses of fiber. As described above, a tow comprises a strip of fiber having a predefined tow width. Additionally, as described with respect to FIG. 1B, the finite width of the course is equal to the number of tows multiplied by the predefined tow width plus a nominal tow gap between each of the number of tows multiplied by n−1. In some implementations, the stagger requirements are determined to prohibit the normalized difference from being a multiple of the predefined tow width plus the nominal tow gap. Furthermore, the stagger requirements determination block is configured to define a discrete set of possible distances along the geodesic curve for the fiber placement start location of each ply in the group.

In some implementations, the first system 200A includes a candidate fiber placement start locations block 212 configured to determine a set of candidate fiber placement start locations for each ply in the group based on the discrete set of possible distances. In some example implementations, the one or more processors 201 are further configured to determine, for each of the plies in the group, a plurality of geodesic curves on the definition surface normal to the reference curve and determine intersections of each of the plurality of geodesic curves with the ply boundary (e.g., from the laminate definition), and for one of the plurality of geodesic curves, measure a distance from the reference curve to the intersections of the one geodesic curve with the ply boundary to thereby determine the distance to a boundary edge of the ply. The one or more processors are further configured to shift each of the candidate fiber placement start locations, in the set of candidate fiber placement start locations, for a ply in the group along the one geodesic curve by integer multiples of the finite width of fiber material to be within a threshold distance of the boundary edge of the ply and within the ply boundary. In some implementations, the threshold distance can be approximately equal to the course width (i.e., the width of the finite width of fiber).

In some implementations, the set of candidate fiber placement start locations is narrowed down to determine a single fiber placement start location for each ply in the group using various means. For example, in some implementations, the one or more processors 201 are further configured to determine if any of the candidate fiber placement start locations in the set of candidate fiber placement start locations are capable of being eliminated to ensure that every candidate fiber placement start location in the set falls within the ply boundary. As another example, in some implementations, the first system 200A includes an integer optimization algorithm and the first system is configured to populate the integer optimization algorithm with the set of candidate fiber placement start locations to determine an optimization solution indicating which of the set of candidate fiber placement start locations for each ply in the group complies with an objective function of the integer optimization algorithm and one or more constraints. In some implementations, the objective function or the one or more constraints include the stagger requirements. The first system is configured to then execute the integer optimization algorithm to obtain the optimization solution.

In some implementations, the integer optimization algorithm includes a constraint defined to ensure that an edge of one of the tows of one of the one or more courses contained within a ply in the group is aligned with the boundary edge of the ply, the boundary edge of the ply being parallel to the fiber direction of the ply. Alternatively, or in addition, in some implementations, the integer optimization algorithm includes an integer optimization definition defining the set of candidate fiber placement start locations such that each candidate fiber placement start location in the set is an integer multiple of the predefined tow width plus the nominal tow gap away from the boundary edge of the ply that is parallel to the fiber direction of the ply. In this case, the edge of the tow is aligned with the boundary edge of the ply in the group such that an angle between the edge of the tow and the boundary edge of the ply is less than a threshold angle, the angle and the threshold angle being different with respect to one another. In some example implementations, the threshold angle is five degrees or less. That is, the edge of the tow and the boundary edge of the ply are parallel with respect to each other or nearly parallel within the threshold angle.

In some other implementations, the integer optimization algorithm includes a constraint defined to ensure that crenulated edges of two plies within the group that share at least a portion of the ply boundary are complimentary, complimentary being defined as arranging the two plies such that crenulated edges of a first of the two plies are not aligned with crenulated edges of a second of the two plies. Alternatively, the one or more processors 201 are configured to define the set of candidate fiber placement start locations such that a first candidate fiber placement start location in the set for a first ply in the group is separated from a second candidate fiber placement start location in the set for a second ply in the group by an integer-plus-a-half multiple of the predefined tow width as measured from the reference curve and along the geodesic curve of the ply.

In some implementations, the integer optimization algorithm includes an integer optimization definition defining the set of candidate fiber placement start locations for each ply in the group such that each three-dimensional fiber placement start location for each ply is evenly spaced apart with respect to each other through a thickness of the plies in the group.

In some example implementations, the one or more processors 201 are configured to use the integer optimization algorithm to bias the optimization solution based on either or both of a surface area of a stacking area of the stacking areas and a number of plies within the stacking area.

In some implementations, the first system 200A includes a fiber placement start location computation block 216 configured to compute a three-dimensional fiber placement start location for each ply in the group based on the optimization solution, the reference curve, and the geodesic curve. In some implementations, and as described above with respect to FIG. 1B, the three-dimensional fiber placement start location for each ply is a point on the definition surface through which a centerline of a first course of fiber passes, after which, all other course placement locations in the ply are determined.

As described herein, in some implementations, the ply orientation is defined by a rosette and a fiber angle, and the reference curve is further determined based on the ply orientation. In some implementations, the one or more processors 201 are further configured to determine, for each of the plies in the group, a plurality of geodesic curves on the definition surface normal to the reference curve and determine intersections of each of the plurality of geodesic curves with the ply boundary and to define a discrete set of possible distances along the plurality of geodesic curves. In some implementations, the normalized difference described above is measured along the geodesic curve of the plurality of geodesic curves that is normal to the reference curve for the ply orientation of the group, and the one or more processors being configured to compute the three-dimensional fiber placement start location for each ply is further based on the ply boundary in the laminate definition.

In some implementations, the laminate definition further includes a series of ordered sequences of plies through a thickness of the region of the laminated composite component in which the plurality of plies are contained. In such implementations, the stagger requirements define a minimum distance between the candidate fiber placement start locations of a first ply and the candidate fiber placement start locations of other plies in the same group that are separated by less than a predetermined number of plies in any of the stacking areas of the group.

Figure 2B:
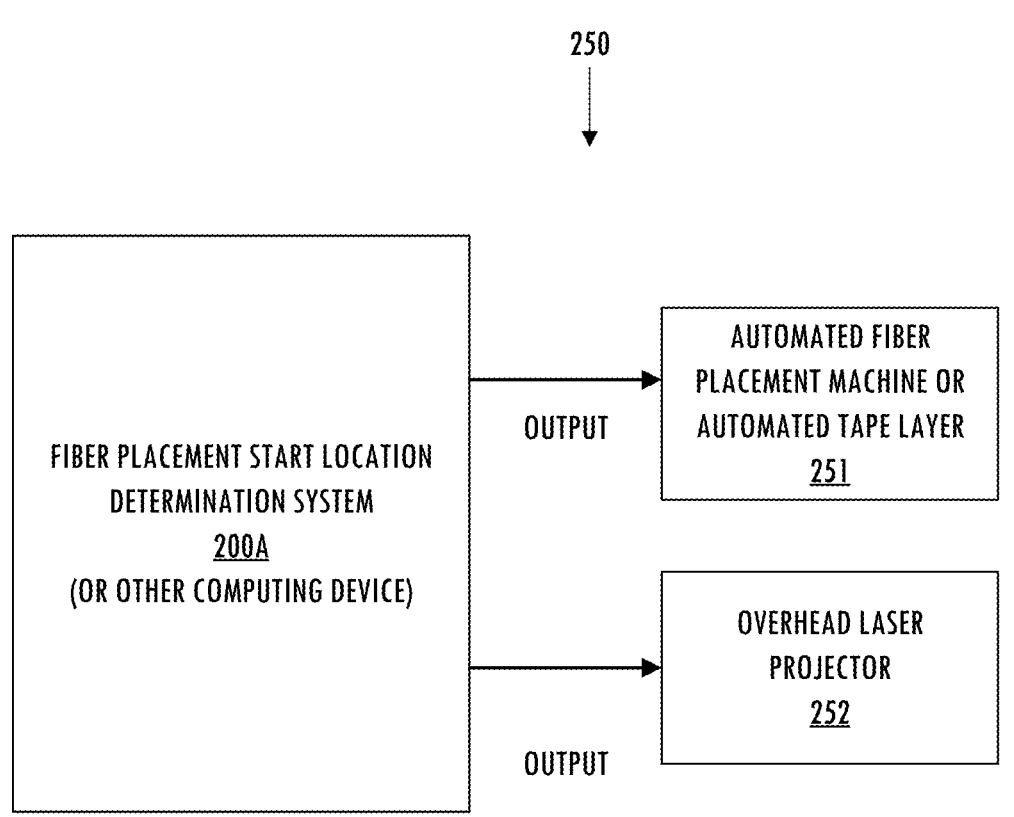
FIG. 2B illustrates a block diagram of the example system outputting data to various output locations, according to some embodiments of the present disclosure.

As shown in FIG. 2A, once the three-dimensional fiber placement start location for each ply is determined (e.g., either for the entire laminated composite component, or for just the particular region on the component), the three-dimensional fiber placement start location is output to another computing device or is processed by the same computing device to produce instructions for an automated fiber placement machine or an automated tape layer 251 illustrated in FIG. 2B to apply fiber to manufacture the laminated composite component. For example, each of the one or more courses of fiber is applied with a single pass of a fiber applicator such as the automated fiber placement (AFP) machine or automated tape layer (ATL) illustrated in FIG. 2B. In such an example, the one or more processors 201 are configured to output the three-dimensional fiber placement start location for each ply in the group to the computing device or process the three-dimensional fiber placement start location for each ply in the group to generate the instructions for the AFP or ATL.

In another example, the fiber applicator is a hand fiber applicator. In such an example, the one or more processors 201 are further configured to transmit the three-dimensional fiber placement start location for each ply to another computing device for further processing, or the one or more processors can process the three-dimensional fiber placement start location for each ply itself. As part of the further processing, the three-dimensional fiber placement start location for each ply is used to determine where the boundaries of each course are. The shapes of these courses are then fed to a "ply cutter" that trims the plies to the right shape. Then, the shapes of each course are projected onto the surface of the part by an overhead laser projector 252 for the hand fiber applicator to apply the courses to the surface.

In one example implementation, the fiber applicator is a hand fiber applicator and the one or more processors 201 (or another computing device) are further configured to determine a location of boundaries of each of the one or more courses of each ply based on the three-dimensional fiber placement start location for each ply. The one or more processors are further configured to determine a shape of each of the one or more courses of each ply based on the location of the boundaries of each of the one or more courses of each ply. And the one or more processors are further configured to transmit the shape of each of the one or more courses to a laser projector for projecting the shape of each course onto a surface of the laminated composite component for a user to apply fiber using the hand fiber applicator.

Figure 2C:
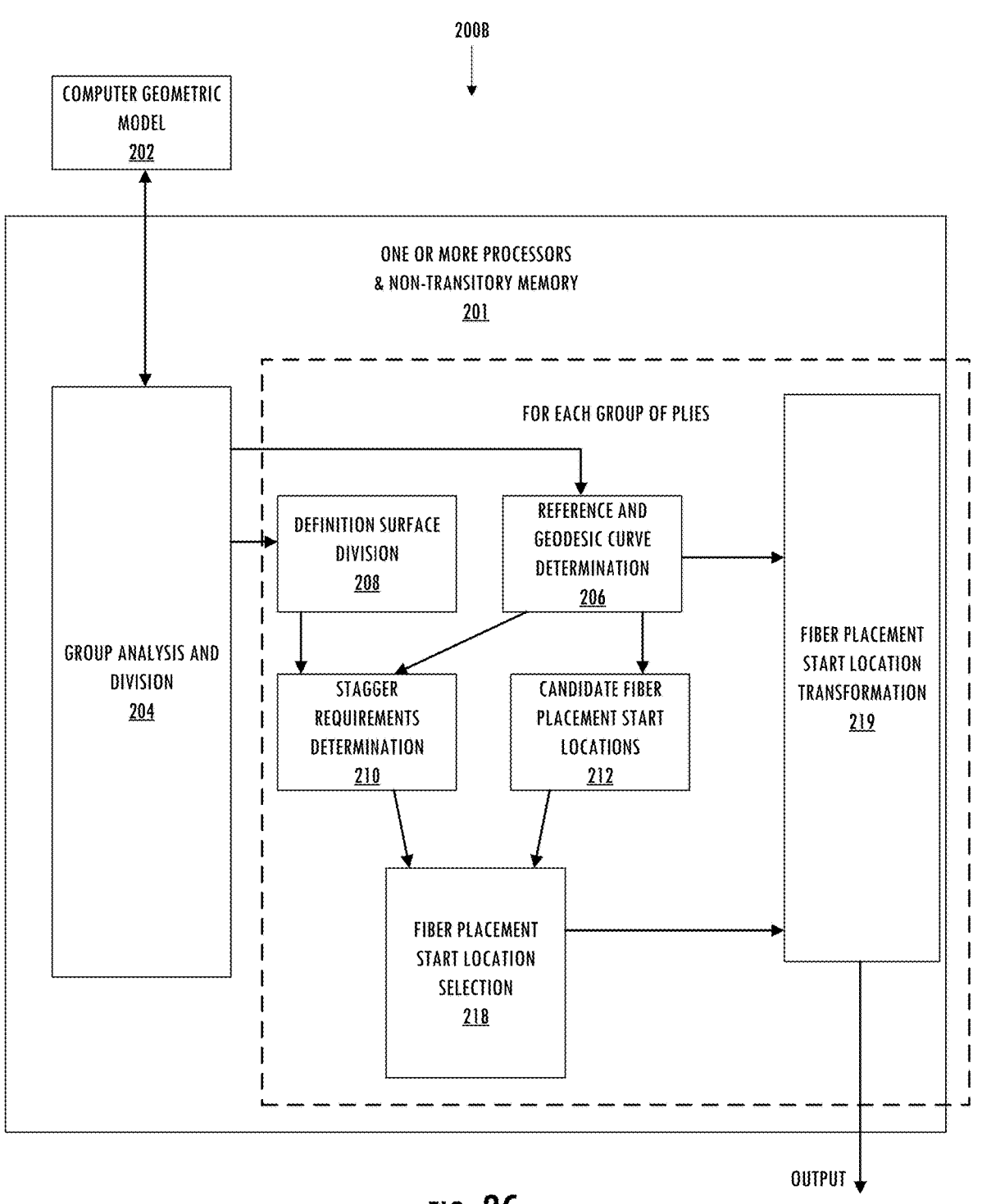
FIG. 2C illustrates a block diagram of another example system for determining fiber placement start locations for manufacturing a laminated composite component, according to some embodiments of the present disclosure.

In another example implementation of the present disclosure, FIG. 2C illustrates a second system 200B similar to the first system 200A illustrated in FIG. 2A. Similar to the first system, the second system is a system for determining fiber placement start locations for manufacturing a laminated composite component. Instead of using the integer optimization algorithm described above, in some example implementations, other approaches may be used to select the fiber placement start location for each ply. For example, in some implementations, the ply orientation is defined by a fiber direction and the one or more processors are further configured to select the one fiber placement start location for each ply to ensure that an edge of one of the tows of one of the one or more courses contained within a ply in the group is aligned with the boundary edge of the ply, the boundary edge of the ply being parallel to the fiber direction of the ply. Alternatively, the one or more processors 201 are configured to define the set of candidate fiber placement start locations to obtain a defined set of candidate fiber placement start locations such that each candidate fiber placement start location in the set is an integer multiple of the predefined tow width plus the nominal tow gap away from the boundary edge of the ply that is parallel to the fiber direction of the ply. The one or more processors are then configured to select, for each ply in the group, any candidate fiber placement start location from the defined set as the one fiber placement start location. In such an implementation, the edge of the tow is aligned with the boundary edge of the ply in the group such that an angle between the edge of the tow and the boundary edge of the ply is less than a threshold angle (e.g., the edge of the tow is substantially parallel with the boundary edge of the ply in the group within the threshold angle), the angle and the threshold angle being different with respect to one another. For example, the threshold angle can be about ten degrees or less.

In another implementation of the present disclosure, the fiber placement start location transformation block 219 is configured to select the one fiber placement start location for each ply to ensure that crenulated edges of two plies within the group that share at least a portion of the ply boundary are complimentary, complimentary being defined as arranging the two plies such that crenulated edges of a first of the two plies are not aligned with crenulated edges of a second of the two plies. Alternatively, the fiber placement start location transformation block is configured to define the set of candidate fiber placement start locations to obtain a defined set of candidate fiber placement start locations such that a first candidate fiber placement start location in the defined set for a first ply in the group is separated from a second candidate fiber placement start location in the defined set for a second ply in the group by an integer-plus-a-half multiple of the predefined tow width, and select, for each ply in the group, any candidate fiber placement start location from the defined set as the one fiber placement start location.

FIG. 3A illustrates an example table 300 with a plurality of plies numbered in the rows, and stacking areas (i.e., region of the definition surface) numbered in the columns. Although the plies in the table are numbered consecutively, this is for example purposes only, and any number of plies from other ply groups may be layered between the plies listed in the table. Some of the cells include an "X" indicating that the stacking area includes that ply number. If the stagger requirements include requirements that there be a minimum separation between a ply and any other ply within 5 plies through a thickness of any stacking area, the integer optimization problem described herein to determine the fiber placement start locations is a highly coupled or constrained problem. For example, stacking area 1 (SA1) ply 24 has stagger constraints with respect to plies 20-23 above and 26, 28, 30, and 31 below. In another example, stacking area 5 (SA5) ply 24 has stagger constraints with respect to plies 23, 14, 12, and 10 above, and plies 26, 28, 30, and 31 below. As described herein, there is only one fiber placement start location for each ply, thus, in situations with many stacking areas and many plies, the calculations can become quite complex.

FIG. 3B illustrates an example definition surface 310 with a reference curve 312 overlaid thereon that was determined based on the ply orientation and the data characterizing the definition surface. The reference curve is determined to be either parallel (e.g., aligned with) to the fiber direction (e.g., the direction on the reference curve along which the courses of fiber are applied/laid) or substantially perpendicular to the fiber direction.

FIG. 3C illustrates an example determination of the geodesic curve and intersections described herein. FIG. 3C is a close-up of a portion of the example definition surface described above in FIG. 3B and includes the reference curve 312 positioned in parallel with the fiber direction. A portion of the definition surface includes a region 313 on which plies will be laid, including a ply boundary 314. The region is an area on the definition surface where the courses of the ply will be laid. A geodesic curve 315 is determined that is normal to the reference curve and overlaid on the definition surface, including through the region. Intersections 316 of the geodesic curve with the ply boundary are determined. As described above, in some implementations, multiple geodesic curves are determined that are normal to the reference curve and intersections of each of the geodesic curve are determined. One of these geodesic curves is used in subsequent steps. In one implementation the geodesic curve for a ply is selected if it intersects an edge that is substantially parallel to the fiber direction. In another implementation the geodesic curve is selected such that the distance between two intersections 316 is larger than the course width.

As described above, once the intersections 316 are determined, a distance from the reference curve 312 to the intersections of the geodesic curve with the ply boundary 314 are determined to thereby determine the distance to a boundary edge of the ply. The first system 200A and second system 200B are then configured to determine the stagger requirements and compute the three-dimensional start locations as described above using the reference curve and/or geodesic curves determined in FIG. 3C.

Figure 3D:
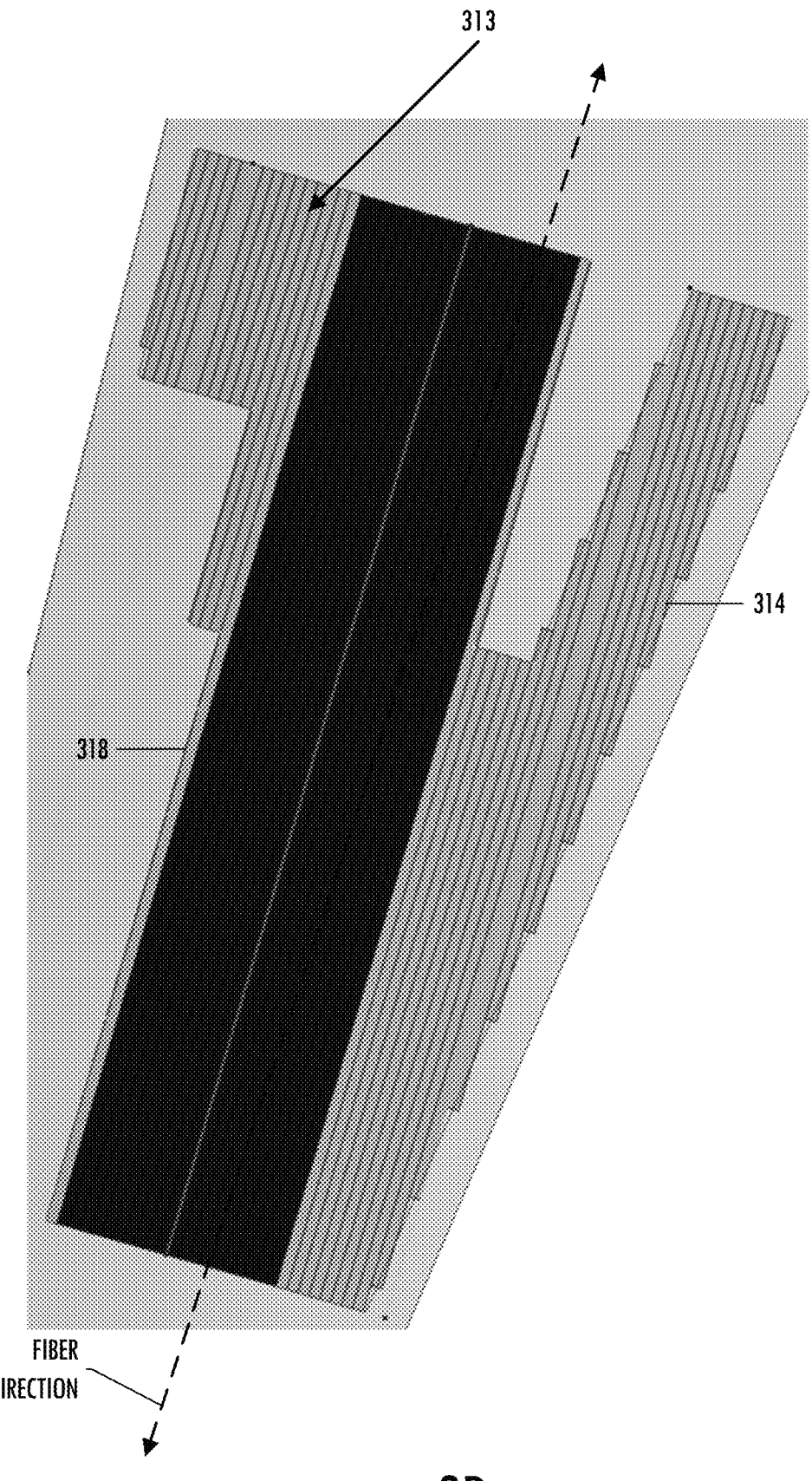

FIG. 3D illustrates the region 313 from FIG. 3C where a single ply (i.e., multiple courses laid in one layer) has been laid over the area using a fiber placement start location determined using one of the systems described herein. In this example, the fiber direction is substantially parallel with the boundary edge 318 and the amount of fiber hanging over the edge is minimized as described herein.

Figure 3E:
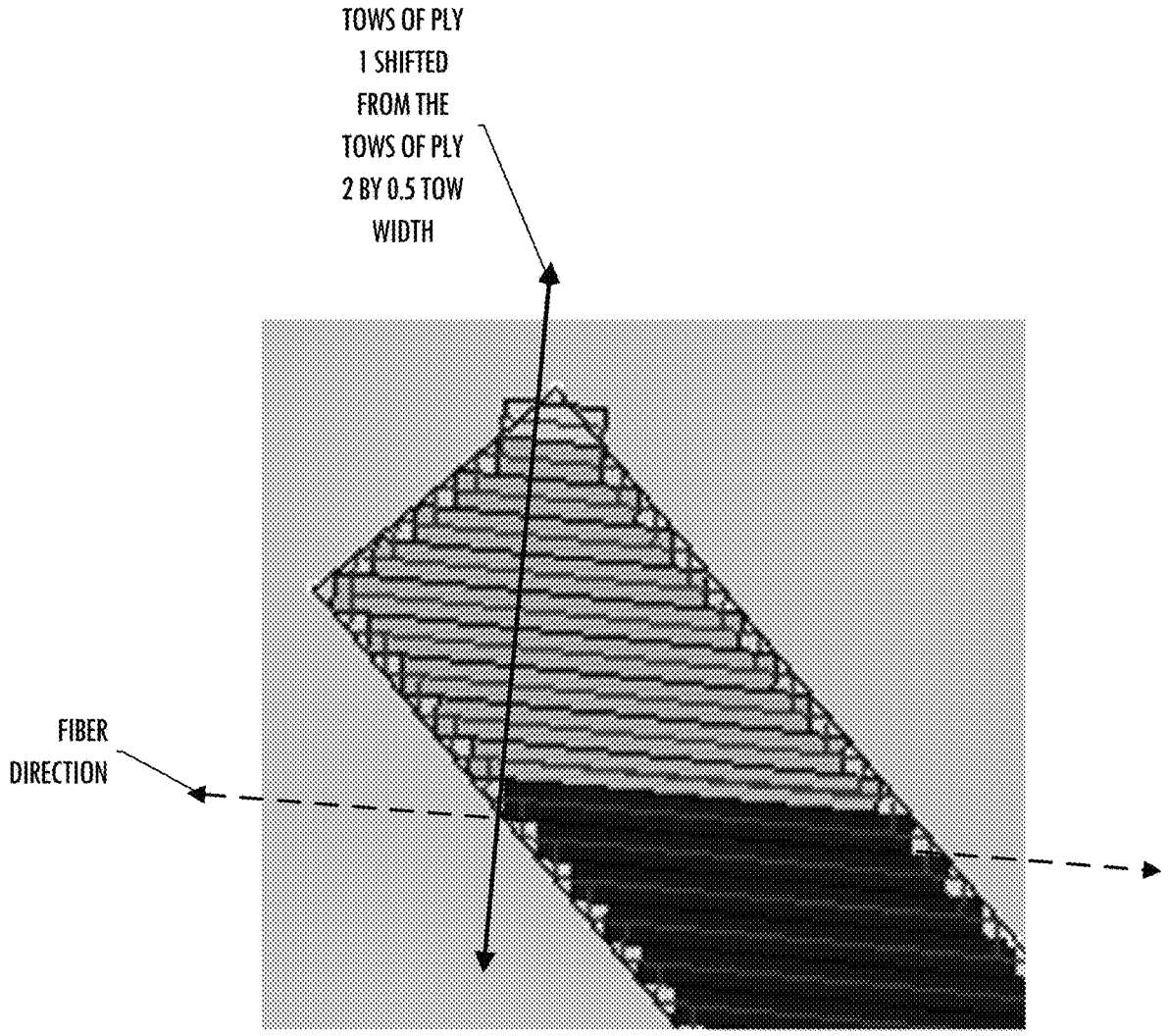

FIG. 3E illustrates two complementary plies overlaid on each other, where the crenulations of the first ply fill in the crenulations of the second ply. The first ply is offset from the second ply by about a 0.5 tow width.

FIGS. 4A and 4B illustrate a flow chart of a first example method 400 for determining fiber placement start locations for manufacturing a laminated composite component. In some implementations, the laminated composite component is manufactured by applying a plurality of plies to a region of the laminated composite component in a specified sequence, wherein each of the plurality of plies comprises a layer of fiber made up of one or more courses of fiber, each course of the one or more courses of fiber comprising a finite width of fiber material. As shown in block 402, the first example method comprises accessing, by one or more processors in communication with a non-transitory computer readable medium having executable instructions stored therein, a computer geometric model of the laminated composite component, the computer geometric model comprising data characterizing parameters of the laminated composite component, the data including: a laminate definition including the plurality of plies, each of the plurality of plies defined by a ply orientation and a ply boundary; and data characterizing a definition surface comprising a predetermined surface of the region on which the ply boundaries are defined.

As shown at block 404, the first example method 400 includes analyzing the computer geometric model, by the one or more processors, and grouping all plies of the plurality of plies that have a same ply orientation into one or more groups. The following steps are performed by the one or more processors for each of the one or more groups. As shown at block 406, the first example method includes determining a reference curve on the definition surface for the ply orientation of the group based on the ply orientation and the data characterizing the definition surface. As shown at block 408, the first example method includes determining, for each of the plies in the group, a geodesic curve on the definition surface normal to the reference curve. As shown at block 410, the first example method includes dividing the definition surface into stacking areas that each have an identical set of plies through a thickness of the plurality of plies of the group.

As shown at block 412, the first example method 400 includes determining, from the laminate definition and for each of the stacking areas, stagger requirements between two plies of the identical set of plies of the stacking areas, wherein stagger is defined as a normalized difference in distance along the geodesic curve between a first fiber placement start location of a first ply in the identical set of plies and a second fiber placement start location of a second ply in the identical set of plies, wherein the normalized difference is with respect to the finite width of fiber material of a course of the first ply or the second ply. As shown at block 414, the first example method includes defining a discrete set of possible distances along the geodesic curve for the fiber placement start location of each ply in the group. As shown at block 416, the first example method includes determining a set of candidate fiber placement start locations for each ply in the group based on the discrete set of possible distances.

As shown at block 418 of FIG. 4B, the first example method 400 includes populating an integer optimization algorithm with the set of candidate fiber placement start locations to determine an optimization solution indicating which of the set of candidate fiber placement start locations for each ply in the group complies with an objective function of the integer optimization algorithm and one or more constraints, the objective function or the one or more constraints including the stagger requirements. As shown at block 420, the first example method includes executing the integer optimization algorithm to obtain the optimization solution. As shown at block 422, the first example method includes computing a three-dimensional fiber placement start location for each ply in the group based on the optimization solution, the reference curve, and the geodesic curve.

FIGS. 4C and 4D illustrate a flow chart of a second example method 450 for determining fiber placement start locations for manufacturing a laminated composite component. In some implementations, the laminated composite component is manufactured by applying a plurality of plies to a region of the laminated composite component in a specified sequence, wherein each of the plurality of plies comprises a layer of fiber made up of one or more courses of fiber, each course of the one or more courses of fiber comprising a finite width of fiber material. As shown at block 452, the second example method includes accessing, by one or more processors in communication with a non-transitory computer readable medium having executable instructions stored therein, a computer geometric model of the laminated composite component, the computer geometric model comprising data characterizing parameters of the laminated composite component, the data including: a laminate definition including the plurality of plies, each of the plurality of plies defined by a ply orientation and a ply boundary; and data characterizing a definition surface comprising a predetermined surface of the region on which the ply boundaries are defined.

As shown at block 454, the second example method 450 includes analyzing the computer geometric model, by the one or more processors, and grouping all plies of the plurality of plies that have a same ply orientation into one or more groups. The following steps are performed by the one or more processors for each of the one or more groups. As shown at block 456, the second example method includes determining a reference curve on the definition surface for the ply orientation of the group based on the ply orientation and the data characterizing the definition surface. As shown at block 458, the second example method includes determining, for each of the plies in the group, a geodesic curve on the definition surface normal to the reference curve.

As shown at block 460, the second example method 450 includes dividing the definition surface into stacking areas that each have an identical set of plies through a thickness of the plurality of plies of the group. As shown at block 462, the second example method includes determining, from the laminate definition and for each of the stacking areas, stagger requirements between two plies of the identical set of plies of the stacking areas, wherein stagger is defined as a normalized difference in distance along the geodesic curve between a first fiber placement start location of a first ply in the identical set of plies and a second fiber placement start location of a second ply in the identical set of plies, wherein the normalized difference is with respect to the finite width of fiber material of a course of the first ply or the second ply. As shown at block 464, the second example method includes defining a discrete set of possible distances along the geodesic curve for the fiber placement start location of each ply in the group.

As shown at block 466, the second example method 450 includes determining a set of candidate fiber placement start locations for each ply in the group based on the discrete set of possible distances. As shown at block 468 of FIG. 4D, the second example method includes selecting, from the set of candidate fiber placement start locations, one fiber placement start location for each ply in the group that satisfy the stagger requirements. As shown at block 470, the second example method includes transforming the one fiber placement start location for each ply in the group into a three-dimensional fiber placement start location based on the reference curve and the geodesic curve.

According to example implementations of the present disclosure, the first system 200A or second system 200B for determining fiber placement start locations for manufacturing a laminated composite component is implemented by various means. Means for implementing the systems includes hardware, alone or under direction of one or more computer programs from a computer-readable storage medium. In some examples, one or more apparatuses are configured to function as or otherwise implement the systems shown and described herein. In examples involving more than one apparatus, the respective apparatuses are connected to or otherwise in communication with one another in a number of different manners, such as directly or indirectly via a wired or wireless network or the like.

Figure 5:
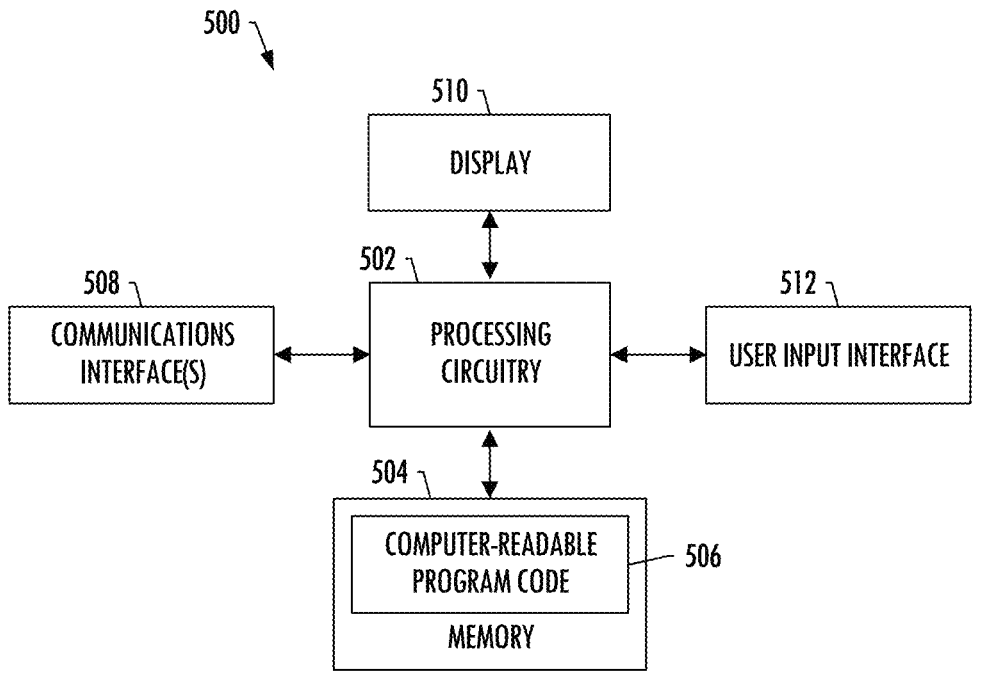
FIG. 5 illustrates an example apparatus for performing the method and other functions described herein, according to some embodiments of the present disclosure.

FIG. 5 illustrates an apparatus 500 capable of implementing the first system 200A of FIG. 2A and/or the second system 200B of FIG. 2C for determining fiber placement start locations for manufacturing a laminated composite component. The apparatus 500 is an example device that is used to implement the methods and functions described above with respect to the system for determining fiber placement start locations for manufacturing a laminated composite component. Generally, an apparatus of exemplary implementations of the present disclosure comprises, includes, or is embodied in one or more fixed or portable electronic devices. Examples of suitable electronic devices include a microcontroller, controller, smartphone, tablet computer, laptop computer, desktop computer, workstation computer, server computer or the like. The apparatus includes one or more of each of a number of components such as, for example, processing circuitry 502 (e.g., processor unit or computer processor) connected to a memory 504 (e.g., storage device).

The processing circuitry 502 is composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which is packaged as an integrated circuit or multiple interconnected integrated circuits (an integrated circuit at times more commonly referred to as a "chip"). The processing circuitry is configured to execute computer programs, which are stored onboard the processing circuitry or otherwise stored in the memory 504 (of the same or another apparatus).

The processing circuitry 502 includes a number of processors, a multi-core processor or some other type of processor, depending on the particular implementation. Further, the processing circuitry is implemented using a number of heterogeneous processor systems in which a main processor is present with one or more secondary processors on a single chip. As another illustrative example, the processing circuitry is a symmetric multi-processor system containing multiple processors of the same type. In yet another example, the processing circuitry is embodied as or otherwise include one or more ASICs, FPGAs or the like. Thus, although the processing circuitry is capable of executing a computer program to perform one or more functions, the processing circuitry of various examples is capable of performing one or more functions without the aid of a computer program. In either instance, the processing circuitry is appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory includes volatile and/or non-volatile memory, and is fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks include compact disk-read only memory (CD-ROM), compact disk-read/write (CD-R/W), DVD or the like. In various instances, the memory is referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein generally refer to a computer-readable storage medium or computer-readable transmission medium.

In addition to the memory 504, the processing circuitry 502 is also connected to one or more interfaces for displaying, transmitting and/or receiving information. The interfaces include a communications interface 508 (e.g., communications unit) and/or one or more user interfaces. The communications interface is configured to transmit and/or receive information, such as to and/or from other apparatus (es), network(s) or the like. The communications interface is configured to transmit and/or receive information by physical (wired) and/or wireless communications links. Examples of suitable communication interfaces include a network interface controller (NIC), wireless NIC (WNIC) or the like.

The user interfaces include a display 510 and/or one or more user input interfaces 512 (e.g., input/output unit). The display is configured to present or otherwise display information to a user, suitable examples of which include a liquid crystal display (LCD), light-emitting diode display (LED), plasma display panel (PDP) or the like. The user input interfaces are wired or wireless, and are configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces further include one or more interfaces for communicating with peripherals such as printers, scanners or the like.

As indicated above, program code instructions are stored in memory, and executed by processing circuitry that is thereby programmed, to implement functions of the systems, subsystems, tools and their respective elements described herein. As will be appreciated, any suitable program code instructions are loaded onto a computer or other programmable apparatus from a computer-readable storage medium to produce a particular machine, such that the particular machine becomes a means for implementing the functions specified herein. These program code instructions are also stored in a computer-readable storage medium that direct a computer, a processing circuitry or other programmable apparatus to function in a particular manner to thereby generate a particular machine or particular article of manufacture. The instructions stored in the computer-readable storage medium produce an article of manufacture, where the article of manufacture becomes a means for implementing functions described herein. The program code instructions are retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions are performed sequentially such that one instruction is retrieved, loaded and executed at a time. In some example implementations, retrieval, loading and/or execution are performed in parallel such that multiple instructions are retrieved, loaded, and/or executed together. Execution of the program code instructions produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, the apparatus 500 includes the processing circuitry 502 and the computer-readable storage medium or memory 504 coupled to the processing circuitry, where the processing circuitry is configured to execute computer-readable program code 506 stored in the memory. It will also be understood that one or more functions, and combinations of functions, are implemented by special purpose hardware-based computer systems and/or processing circuitry which perform the specified functions, or combinations of special purpose hardware and program code instructions.

Many modifications and other implementations of the inventions set forth herein will come to mind to one skilled in the art to which these disclosed implementations pertain having the benefit of the teachings presented in the foregoing descriptions and the associated drawings. Therefore, it is to be understood that implementations of the invention are not to be limited to the specific implementations disclosed and that modifications and other implementations are intended to be included within the scope of the invention. Moreover, although the foregoing descriptions and the associated drawings describe example implementations in the context of certain example combinations of elements and/or functions, it should be appreciated that different combinations of elements and/or functions are be provided by alternative implementations without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. are used herein to describe various steps or calculations, these steps or calculations should not be limited by these terms. These terms are only used to distinguish one operation or calculation from another. For example, a first calculation is termed a second calculation, and, similarly, a second step is termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular implementations only and is not intended to be limiting.

That which is claimed:

1. A method for determining fiber placement start locations for manufacturing a laminated composite component, the laminated composite component being manufactured by applying a plurality of plies to a region of the laminated composite component in a specified sequence, wherein each of the plurality of plies comprises a layer of fiber made up of one or more courses of fiber, each course of the one or more courses of fiber comprising a finite width of fiber material, the method comprising:

accessing, by one or more processors in communication with a non-transitory computer readable medium having executable instructions stored therein, a computer geometric model of the laminated composite component, the computer geometric model comprising data characterizing parameters of the laminated composite component, the data including:

a laminate definition including the plurality of plies, each of the plurality of plies defined by a ply orientation and a ply boundary; and data characterizing a definition surface comprising a predetermined surface of the region on which ply boundaries are defined;

analyzing the computer geometric model, by the one or more processors, and grouping all plies of the plurality of plies that have a same ply orientation into one or more groups;

for each of the one or more groups, the one or more processors:

determining a reference curve on the definition surface for the ply orientation of the group based on the ply orientation and the data characterizing the definition surface;

determining, for each of the plies in the group, a geodesic curve on the definition surface normal to the reference curve;

dividing the definition surface into stacking areas that each have an identical set of plies through a thickness of the plurality of plies of the group;

determining, from the laminate definition and for each of the stacking areas, stagger requirements between two plies of the identical set of plies of the stacking areas, wherein stagger is defined as a normalized difference in distance along the geodesic curve between a first fiber placement start location of a first ply in the identical set of plies and a second fiber placement start location of a second ply in the identical set of plies, wherein the normalized difference is with respect to the finite width of fiber material of a course of the first ply or the second ply;

defining a discrete set of possible distances along the geodesic curve for the fiber placement start location of each ply in the group;

determining a set of candidate fiber placement start locations for each ply in the group based on the discrete set of possible distances;

populating an integer optimization algorithm with the set of candidate fiber placement start locations to determine an optimization solution indicating which of the set of candidate fiber placement start locations for each ply in the group complies with an objective function of the integer optimization algorithm and one or more constraints, the objective function or the one or more constraints including the stagger requirements;

executing the integer optimization algorithm to obtain the optimization solution;

computing a three-dimensional fiber placement start location for each ply in the group based on the optimization solution, the reference curve, and the geodesic curve;

applying each of the one or more courses of fiber with a single pass of a fiber applicator, wherein the fiber applicator is an automated fiber placement machine or an automated tape layer; and generating instructions, using the three-dimensional fiber placement start location for each ply in the group, the one or more processors or another computing device, for the automated fiber placement machine or the automated tape layer for automatically applying fiber to the region to create the laminated composite component.

2. The method of claim 1, wherein the three-dimensional fiber placement start location for each ply is a point on the definition surface through which a centerline of a first course of fiber passes, after which, all other course placement locations in the ply are capable of being determined.

3. The method of claim 1, further comprising receiving, by the one or more processors, data indicating a number of tows (n) in each of the one or more courses of fiber, a tow comprising a strip of fiber having a predefined tow width, wherein the finite width of the course is equal to the number of tows multiplied by the predefined tow width plus a nominal tow gap between each of the number of tows multiplied by n−1; and wherein the stagger requirements are determined to prohibit the normalized difference from being a multiple of the predefined tow width plus the nominal tow gap.

4. The method of claim 3, wherein determining the geodesic curve includes determining, for each of the plies in the group, a plurality of geodesic curves on the definition surface normal to the reference curve and determining intersections of each of the plurality of geodesic curves with the ply boundary, and for one of the plurality of geodesic curves, measuring a distance from the reference curve to the intersections of the one geodesic curve with the ply boundary to thereby determine a boundary edge of the ply; the method further comprising:

shifting each of the candidate fiber placement start locations, in the set of candidate fiber placement start locations, for a ply in the group along the one geodesic curve by integer multiples of the finite width of fiber material to be within a threshold distance of the boundary edge of the ply and within the ply boundary.

5. The method of claim 4, further comprising determining if any of the candidate fiber placement start locations in the set of candidate fiber placement start locations are capable of being eliminated to ensure that every candidate fiber placement start location in the set falls within the ply boundary.

6. The method of claim 4, wherein the integer optimization algorithm includes a constraint defined to ensure the three-dimensional fiber placement start location computed for each ply falls within the ply boundary.

7. The method of claim 3, wherein the ply orientation is defined by a fiber direction; and wherein the integer optimization algorithm includes either of:

a constraint defined to ensure that an edge of one of the tows of one of the one or more courses contained within a ply in the group is aligned with a boundary edge of the ply, the boundary edge of the ply being parallel to the fiber direction of the ply; or an integer optimization definition defining the set of candidate fiber placement start locations such that each candidate fiber placement start location in the set is an integer multiple of the predefined tow width plus the nominal tow gap away from the boundary edge of the ply that is parallel to the fiber direction of the ply; and wherein the edge of the tow is aligned with the boundary edge of the ply in the group such that an angle between the edge of the tow and the boundary edge of the ply is less than a threshold angle, the angle and the threshold angle being different with respect to one another.

8. The method of claim 3, wherein the integer optimization algorithm includes:

a constraint defined to ensure that crenulated edges of two plies within the group that share at least a portion of the ply boundary are complimentary, complimentary being defined as arranging the two plies such that crenulated edges of a first of the two plies are not aligned with crenulated edges of a second of the two plies; or defining the set of candidate fiber placement start locations such that a first candidate fiber placement start location in the set for a first ply in the group is separated from a second candidate fiber placement start location in the set for a second ply in the group by an integer-plus-a-half multiple of the predefined tow width.

9. The method of claim 1, further comprising the integer optimization algorithm biasing the optimization solution based on either or both of:

a surface area of a stacking area of the stacking areas; and a number of plies within the stacking area.

10. The method of claim 1, wherein the ply orientation is defined by a rosette and a fiber angle, and the reference curve is further determined based on the ply orientation;

wherein determining the geodesic curve includes determining, for each of the plies in the group, a plurality of geodesic curves on the definition surface normal to the reference curve and determining intersections of each of the plurality of geodesic curves with the ply boundary;

wherein defining the discrete set of possible distances includes defining a discrete set of possible distances along the plurality of geodesic curves;

wherein the normalized difference is measured along a geodesic curve of the plurality of geodesic curves that is normal to the reference curve for the ply orientation of the group; and wherein computing the three-dimensional fiber placement start location for each ply is further based on the ply boundary in the laminate definition.

11. The method of claim 1, wherein the laminate definition further includes a series of ordered sequences of plies through a thickness of the region of the laminated composite component in which the plurality of plies are contained; and wherein the stagger requirements define a minimum distance between the candidate fiber placement start locations of a first ply and the candidate fiber placement start locations of other plies in a same group that are separated by less than a predetermined number of plies in any of the stacking areas of the group.

12. The method of claim 1, wherein the integer optimization algorithm includes:

an integer optimization definition defining the set of candidate fiber placement start locations for each ply in the group such that each three-dimensional fiber placement start location for each ply is evenly spaced apart with respect to each other through a thickness of the plies in the group.

13. The method of claim 1, wherein the one or more processors are in communication with a user input interface.

14. A method for determining fiber placement start locations for manufacturing a laminated composite component, the laminated composite component being manufactured by applying a plurality of plies to a region of the laminated composite component in a specified sequence, wherein each of the plurality of plies comprises a layer of fiber made up of one or more courses of fiber, each course of the one or more courses of fiber comprising a finite width of fiber material, the method comprising:

accessing, by one or more processors in communication with a non-transitory computer readable medium having executable instructions stored therein, a computer geometric model of the laminated composite component, the computer geometric model comprising data characterizing parameters of the laminated composite component, the data including:

a laminate definition including the plurality of plies, each of the plurality of plies defined by a ply orientation and a ply boundary; and data characterizing a definition surface comprising a predetermined surface of the region on which ply boundaries are defined;

analyzing the computer geometric model, by the one or more processors, and grouping all plies of the plurality of plies that have a same ply orientation into one or more groups;

for each of the one or more groups, the one or more processors:

determining a reference curve on the definition surface for the ply orientation of the group based on the ply orientation and the data characterizing the definition surface;

determining, for each of the plies in the group, a geodesic curve on the definition surface normal to the reference curve;

dividing the definition surface into stacking areas that each have an identical set of plies through a thickness of the plurality of plies of the group;

determining, from the laminate definition and for each of the stacking areas, stagger requirements between two plies of the identical set of plies of the stacking areas, wherein stagger is defined as a normalized difference in distance along the geodesic curve between a first fiber placement start location of a first ply in the identical set of plies and a second fiber placement start location of a second ply in the identical set of plies, wherein the normalized difference is with respect to the finite width of fiber material of a course of the first ply or the second ply;

defining a discrete set of possible distances along the geodesic curve for the fiber placement start location of each ply in the group;

determining a set of candidate fiber placement start locations for each ply in the group based on the discrete set of possible distances;

populating an integer optimization algorithm with the set of candidate fiber placement start locations to determine an optimization solution indicating which of the set of candidate fiber placement start locations for each ply in the group complies with an objective function of the integer optimization algorithm and one or more constraints, the objective function or the one or more constraints including the stagger requirements;

executing the integer optimization algorithm to obtain the optimization solution;

computing a three-dimensional fiber placement start location for each ply in the group based on the optimization solution, the reference curve, and the geodesic curve; and applying each of the one or more courses of fiber a single pass of a fiber applicator, wherein the fiber applicator is a hand fiber applicator and the method further comprises:

the one or more processors, or another computing device, determining a location of boundaries of each of the one or more courses of each ply based on the three-dimensional fiber placement start location for each ply;

determining a shape of each of the one or more courses of each ply based on the location of the boundaries of each of the one or more courses of each ply; and transmitting the shape of each of the one or more courses to a laser projector for projecting the shape of each course onto a surface of the laminated composite component for a user to apply fiber using the hand fiber applicator.

15. A system configured to determine fiber placement start locations and manufacture a laminated composite component that comprises a plurality of plies applied to a region of the laminated composite component in a specified sequence, wherein each of the plurality of plies comprises a layer of fiber made up of one or more courses of fiber, wherein:

each course of the one or more courses of fiber comprises a finite width of fiber material applied with a single pass of an automated fiber placement machine or an automated tape layer;

one or more processors, or another computing device, are configured to generate instructions, based on a three-dimensional fiber placement start location for each ply in a group, for the automated fiber placement machine or the automated tape layer for automatically applying fiber to the region to create the laminated composite component; and the system comprises:

one or more processors in communication with a non-transitory computer readable medium having executable instructions stored therein, that when executed causes the one or more processors to:

access a computer geometric model of the laminated composite component, wherein the computer geometric model comprises data that characterizes parameters of the laminated composite component, wherein the data comprises:

a laminate definition including the plurality of plies, each of the plurality of plies defined by a ply orientation and a ply boundary; and data that characterizes a definition surface that characterizes a predetermined surface of the region on which ply boundaries are defined;

analyze the computer geometric model and group all plies of the plurality of plies that have a same ply orientation into one or more groups;

for each of the one or more groups, the one or more processors further configured to:

determine a reference curve on the definition surface for the ply orientation of the group based on the ply orientation and the data characterizing the definition surface;

determine, for each of the plies in the group, a geodesic curve on the definition surface normal to the reference curve;

divide the definition surface into stacking areas that each have an identical set of plies through a thickness of the plurality of plies of the group;

determine, from the laminate definition and for each of the stacking areas, stagger requirements between two plies of the identical set of plies of the stacking areas, wherein stagger is defined as a normalized difference in distance along the geodesic curve between a first fiber placement start location of a first ply in the identical set of plies and a second fiber placement start location of a second ply in the identical set of plies, wherein the normalized difference is with respect to the finite width of fiber material of a course of the first ply or the second ply;

define a discrete set of possible distances along the geodesic curve for the fiber placement start location of each ply in the group;

determine a set of candidate fiber placement start locations for each ply in the group based on the discrete set of possible distances;

populate an integer optimization algorithm with the set of candidate fiber placement start locations to determine an optimization solution indicating which of the set of candidate fiber placement start locations for each ply in the group complies with an objective function of the integer optimization algorithm and one or more constraints, the objective function or the one or more constraints including the stagger requirements;

execute the integer optimization algorithm to obtain the optimization solution; and compute a three-dimensional fiber placement start location for each ply in the group based on the optimization solution, the reference curve, and the geodesic curve.

16. A method for determining fiber placement start locations for manufacturing a laminated composite component, the laminated composite component being manufactured by applying a plurality of plies to a region of the laminated composite component in a specified sequence, wherein each of the plurality of plies comprises a layer of fiber made up of one or more courses of fiber, each course of the one or more courses of fiber comprising a finite width of fiber material, the method comprising:

accessing, by one or more processors in communication with a non-transitory computer readable medium having executable instructions stored therein, a computer geometric model of the laminated composite component, the computer geometric model comprising data characterizing parameters of the laminated composite component, the data including:

a laminate definition including the plurality of plies, each of the plurality of plies defined by a ply orientation and a ply boundary; and data characterizing a definition surface comprising a predetermined surface of the region on which ply boundaries are defined;

analyzing the computer geometric model, by the one or more processors, and grouping all plies of the plurality of plies that have a same ply orientation into one or more groups;

for each of the one or more groups, the one or more processors:

determining a reference curve on the definition surface for the ply orientation of the group based on the ply orientation and the data characterizing the definition surface;

determining, for each of the plies in the group, a geodesic curve on the definition surface normal to the reference curve;

dividing the definition surface into stacking areas that each have an identical set of plies through a thickness of the plurality of plies of the group;

determining, from the laminate definition and for each of the stacking areas, stagger requirements between two plies of the identical set of plies of the stacking areas, wherein stagger is defined as a normalized difference in distance along the geodesic curve between a first fiber placement start location of a first ply in the identical set of plies and a second fiber placement start location of a second ply in the identical set of plies, wherein the normalized difference is with respect to the finite width of fiber material of a course of the first ply or the second ply;

defining a discrete set of possible distances along the geodesic curve for the fiber placement start location of each ply in the group;

determining a set of candidate fiber placement start locations for each ply in the group based on the discrete set of possible distances;

selecting, from the set of candidate fiber placement start locations, one fiber placement start location for each ply in the group that satisfy the stagger requirements;

transforming the one fiber placement start location for each ply in the group into a three-dimensional fiber placement start location based on the reference curve and the geodesic curve;

applying each of the one or more courses of fiber with a single pass of a fiber applicator, wherein the fiber applicator is an automated fiber placement machine or an automated tape layer; and generating instructions, using the three-dimensional fiber placement start location for each ply in the group, the one or more processors or another computing device, for the automated fiber placement machine or the automated tape layer for automatically applying fiber to the region to create the laminated composite component.

17. The method of claim 16, further comprising receiving, by the one or more processors, data indicating a number of tows (n) in each of the one or more courses of fiber, a tow comprising a strip of fiber having a predefined tow width, wherein the finite width of the course is equal to the number of tows multiplied by the predefined tow width plus a nominal tow gap between each of the number of tows multiplied by n−1 wherein the stagger requirements are determined to prohibit the normalized difference from being a multiple of the predefined tow width plus the nominal tow gap.

18. The method of claim 17, wherein determining the geodesic curve includes determining, for each of the plies in the group, a plurality of geodesic curves on the definition surface normal to the reference curve and determining intersections of each of the plurality of geodesic curves with the ply boundary, and for one of the plurality of geodesic curves, measuring a distance from the reference curve to the intersections of the one geodesic curve with the ply boundary to thereby determine a boundary edge of the ply; the method further comprising:

shifting each of the candidate fiber placement start locations, in the set of candidate fiber placement start locations, for a ply in the group along the one geodesic curve by integer multiples of the finite width of fiber material to be within a threshold distance of the boundary edge of the ply and within the ply boundary.

19. The method of claim 18, wherein the ply orientation is defined by a fiber direction;

wherein selecting the one fiber placement start location for each ply in the group includes:

selecting the one fiber placement start location for each ply to ensure that an edge of one of the tows of one of the one or more courses contained within a ply in the group is aligned with the boundary edge of the ply, the boundary edge of the ply being parallel to the fiber direction of the ply; or defining the set of candidate fiber placement start locations to obtain a defined set of candidate fiber placement start locations such that each candidate fiber placement start location in the set is an integer multiple of the predefined tow width plus the nominal tow gap away from the boundary edge of the ply that is parallel to the fiber direction of the ply, and selecting, for each ply in the group, any candidate fiber placement start location from the defined set as the one fiber placement start location; and wherein the edge of the tow is aligned with the boundary edge of the ply in the group such that an angle between the edge of the tow and the boundary edge of the ply is less than a threshold angle, the angle and the threshold angle being different with respect to one another.

20. The method of claim 18, wherein selecting the one fiber placement start location for each ply in the group includes:

selecting the one fiber placement start location for each ply to ensure that crenulated edges of two plies within the group that share at least a portion of the ply boundary are complimentary, complimentary being defined as arranging the two plies such that crenulated edges of a first of the two plies are not aligned with crenulated edges of a second of the two plies; or defining the set of candidate fiber placement start locations to obtain a defined set of candidate fiber placement start locations such that a first candidate fiber placement start location in the defined set for a first ply in the group is separated from a second candidate fiber placement start location in the defined set for a second ply in the group by an integer-plus-a-half multiple of the predefined tow width, and selecting, for each ply in the group, any candidate fiber placement start location from the defined set as the one fiber placement start location.

* * * * *